US012470350B2

(12) United States Patent
Yang et al.

(10) Patent No.: US 12,470,350 B2
(45) Date of Patent: Nov. 11, 2025

(54) OUTER CODING TECHNIQUES IN WIRELESS COMMUNICATIONS

(71) Applicant: QUALCOMM Incorporated, San Diego, CA (US)

(72) Inventors: Wei Yang, San Diego, CA (US); Hwan Joon Kwon, San Diego, CA (US); Krishna Kiran Mukkavilli, San Diego, CA (US); Tingfang Ji, San Diego, CA (US); Jing Jiang, San Diego, CA (US); Aziz Gholmieh, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 998 days.

(21) Appl. No.: 17/411,858

(22) Filed: Aug. 25, 2021

(65) Prior Publication Data

US 2023/0066111 A1    Mar. 2, 2023

(51) Int. Cl.
*H04L 5/00*       (2006.01)
*H04L 1/00*       (2006.01)
*H04L 69/166*     (2022.01)

(52) U.S. Cl.
CPC .......... *H04L 5/0053* (2013.01); *H04L 1/0063* (2013.01); *H04L 1/0071* (2013.01); *H04L 5/0046* (2013.01); *H04L 69/166* (2013.01)

(58) Field of Classification Search
CPC ... H04L 1/0077; H04L 1/1819; H04L 1/0045; H04L 1/1812; H04L 1/0057; H04L 1/0041; H04L 1/0066; H04L 2001/0097; H04L 5/0053; H04L 1/0063; H04L 1/0071; H04L 5/0046; H04L 69/166; H04L 1/0064
See application file for complete search history.

(56) References Cited

U.S. PATENT DOCUMENTS

| | | | |
|---|---|---|---|
| 2007/0274401 A1* | 11/2007 | Lee | H03M 13/2915 |
| | | | 375/E7.002 |
| 2008/0240159 A1* | 10/2008 | Palanki | H04L 47/70 |
| | | | 370/474 |
| 2011/0099446 A1* | 4/2011 | Murakami | H04L 1/1825 |
| | | | 714/E11.131 |
| 2017/0033894 A1* | 2/2017 | Ahn | H04L 1/005 |
| 2017/0111198 A1* | 4/2017 | Park | H04L 27/38 |
| 2018/0278272 A1* | 9/2018 | Li | H04L 1/0061 |
| 2020/0153545 A1* | 5/2020 | Xu | H03M 13/1102 |

* cited by examiner

*Primary Examiner* — Oussama Roudani
(74) *Attorney, Agent, or Firm* — Holland & Hart LLP

(57) ABSTRACT

Methods, systems, and devices for wireless communications are described that provide for a transmitter (e.g., a user equipment (UE) or base station) and receiver (e.g., a UE or base station) to transmit and receive data packets that are encoded according to an outer coding technique. The outer coding technique may provide for data bits and parity bits to be included in a single physical layer transmission. In some cases, data packets (e.g., data bits) may be segmented into multiple subpackets, and coding may be performed across different subpackets of different data packets (e.g., in a diagonal coding pattern). In some examples, each transmission in the physical layer may contain both data subpackets and parity subpackets, which may balance an input and an output load of a buffer (e.g., a layer two (L2) decoding buffer at the receiver) during decoding.

28 Claims, 22 Drawing Sheets

- Configuration Information 215
- DL Transmissions 220
- ACK/NACK Feedback 225
- Retransmission(s) 230

200

OUTER CODING TECHNIQUES IN WIRELESS COMMUNICATIONS

FIELD OF TECHNOLOGY

The following relates to wireless communications, including outer coding techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support outer coding techniques in wireless communications. In accordance with various aspects, the described techniques provide for a transmitter (e.g., a user equipment (UE) or base station) and receiver (e.g., a UE or base station) to transmit and receive data packets that are encoded according to an outer coding technique. In some cases, the outer coding technique provides for data and parity to be included in a single transmission, such as a single physical layer transmission. In some cases, data packets may be segmented into multiple subpackets, and coding may be performed across different subpackets of different data packets (e.g., in a diagonal coding pattern). In some examples, each transmission in the physical layer may contain both data subpackets and parity subpackets, which may balance an input and an output load of a buffer (e.g., a layer two (L2) decoding buffer at the receiver) during decoding, among other benefits.

A method for wireless communication at a first device is described. The method may include identifying a set of information packets for transmission to one or more receiving devices, each packet of the set of information packets for transmission in a respective transmission instance, identifying two or more information subpackets of each packet of the set of information packets, encoding a set of multiple information subpackets from two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance, and transmitting, to the one or more receiving devices, the first information packet in the first transmission instance, the second information packet in the second transmission instance, and the first parity subpacket in a third transmission instance.

An apparatus for wireless communication at a first device is described. The apparatus may include a processor, memory coupled with the processor, and instructions stored in the memory. The instructions may be executable by the processor to cause the apparatus to identify a set of information packets for transmission to one or more receiving devices, each packet of the set of information packets for transmission in a respective transmission instance, identify two or more information subpackets of each packet of the set of information packets, encode a set of multiple information subpackets from two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance, and transmit, to the one or more receiving devices, the first information packet in the first transmission instance, the second information packet in the second transmission instance, and the first parity subpacket in a third transmission instance.

Another apparatus for wireless communication at a first device is described. The apparatus may include means for identifying a set of information packets for transmission to one or more receiving devices, each packet of the set of information packets for transmission in a respective transmission instance, means for identifying two or more information subpackets of each packet of the set of information packets, means for encoding a set of multiple information subpackets from two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance, and means for transmitting, to the one or more receiving devices, the first information packet in the first transmission instance, the second information packet in the second transmission instance, and the first parity subpacket in a third transmission instance.

A non-transitory computer-readable medium storing code for wireless communication at a first device is described. The code may include instructions executable by a processor to identify a set of information packets for transmission to one or more receiving devices, each packet of the set of information packets for transmission in a respective transmission instance, identify two or more information subpackets of each packet of the set of information packets, encode a set of multiple information subpackets from two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance, and transmit, to the one or more receiving devices, the first information packet in the first transmission instance, the second information packet in the second transmission instance, and the first parity subpacket in a third transmission instance.

In some examples of the method, apparatuses, and non-transitory computer-readable medium described herein, a second parity subpacket of the set of parity subpackets may be based on the first information subpacket and the second information subpacket and the method, apparatuses, and non-transitory computer-readable medium may include further operations, features, means, or instructions for transmitting, to the one or more receiving devices, the second parity subpacket in a fourth transmission instance.

In some examples of the method, apparatuses, and non-transitory computer-readable medium described herein, the identifying the two or more information subpackets may include operations, features, means, or instructions for identifying, for each information packet of the set of information packets, a first determined number of information subpackets, and where the first parity subpacket may be encoded using a number of information subpackets that corresponds to the first determined number of information subpackets, and where each information subpacket used to encode the first parity subpacket may be from a different information packet. In some examples of the method, apparatuses, and non-transitory computer-readable medium described herein, the transmitting may include operations, features, means, or instructions for transmitting a second determined number of subpackets in the third transmission instance that include the first determined number of information subpackets of a third information packet and a third determined number of parity subpackets that correspond to a number of parity subpackets in the set of parity subpackets. In some examples of the method, apparatuses, and non-transitory computer-readable medium described herein, each parity subpacket of the third determined number of parity subpackets may be associated with different information subpackets.

In some examples of the method, apparatuses, and non-transitory computer-readable medium described herein, the encoding may include operations, features, means, or instructions for mapping the set of multiple information subpackets into K rows and X columns of a coding table, where each column of the X columns corresponds to a transmission instance and each row of the K rows corresponds to one information subpacket and generating the set of parity subpackets based on a determined relationship between respective parity subpackets of the set of parity subpackets and two or more entries of the coding table. In some examples of the method, apparatuses, and non-transitory computer-readable medium described herein, the two or more entries of the coding table have a diagonal relationship within the coding table, and each parity subpacket of the set of parity subpackets is mapped to a parity entry of the coding table that maintains the diagonal relationship with the two or more entries. In some examples of the method, apparatuses, and non-transitory computer-readable medium described herein, the two or more entries of the coding table include at least two entries for each row of the K rows that are associated with each parity subpacket.

In some examples of the method, apparatuses, and non-transitory computer-readable medium described herein, the identifying the two or more information subpackets may include operations, features, means, or instructions for segmenting each packet of the set of information packets into the two or more information subpackets. In some examples of the method, apparatuses, and non-transitory computer-readable medium described herein, each packet of the set of information packets may be an aggregated packet of two or more data packets that include a data payload, and each subpacket of the two or more information subpackets includes one data packet. Some examples of the method, apparatuses, and non-transitory computer-readable medium described herein may further include operations, features, means, or instructions for writing the set of multiple information subpackets and the set of parity subpackets into a diagonal-in column-out interleaver table, and where the transmitting includes transmitting each column of the diagonal-in column-out interleaver table in a respective transmission instance.

Some examples of the method, apparatuses, and non-transitory computer-readable medium described herein may further include operations, features, means, or instructions for transmitting, to the one or more receiving devices, control information that indicates the set of coding parameters. In some examples of the method, apparatuses, and non-transitory computer-readable medium described herein, the set of coding parameters includes one or more of a number of information subpackets that each information packet is to be segmented into, a total number of subpackets that are transmitted in each transmission instance, or a number of parity subpackets that are transmitted in each transmission instance. In some examples of the method, apparatuses, and non-transitory computer-readable medium described herein, each of the first information packet, the second information packet, and the first parity subpacket, include an indication of an information payload or a parity payload. In some examples of the method, apparatuses, and non-transitory computer-readable medium described herein, each of the first information packet, the second information packet, and the first parity subpacket, include an indication of a table index of a coding table, and the table index of the coding table indicates an information payload or a parity payload.

A method for wireless communication is described. The method may include receiving a set of signals in a set of multiple transmission instances, the set of signals including a first set of signals in a first transmission instance, a second set of signals in a second transmission instance, and a third set of signals in a third transmission instance, decoding a second information packet from the second set of signals in the second transmission instance and a first parity subpacket from the third set of signals in the third transmission instance, where decoding of a first information packet from the first set of signals is unsuccessful, decoding at least a first information subpacket of the first information packet based on a set of coding parameters, a second information subpacket of the second information packet, and the first parity subpacket, and combining, based on decoding the second information packet and the first parity subpacket and at least the first information subpacket, the first information subpacket with one or more other information subpackets of the first information packet to generate the first information packet.

An apparatus for wireless communication is described. The apparatus may include a processor, memory coupled with the processor, and instructions stored in the memory. The instructions may be executable by the processor to cause the apparatus to receive a set of signals in a set of multiple transmission instances, the set of signals including a first set of signals in a first transmission instance, a second set of signals in a second transmission instance, and a third set of signals in a third transmission instance, decode a second information packet from the second set of signals in the second transmission instance and a first parity subpacket from the third set of signals in the third transmission instance, where decoding of a first information packet from the first set of signals is unsuccessful, decode at least a first information subpacket of the first information packet based on a set of coding parameters, a second information subpacket of the second information packet, and the first parity subpacket, and combine, based on decoding the second information packet and the first parity subpacket and at least the first information subpacket, the first information subpacket with one or more other information subpackets of the first information packet to generate the first information packet.

Another apparatus for wireless communication is described. The apparatus may include means for receiving a set of signals in a set of multiple transmission instances, the set of signals including a first set of signals in a first transmission instance, a second set of signals in a second transmission instance, and a third set of signals in a third transmission instance, means for decoding a second information packet from the second set of signals in the second transmission instance and a first parity subpacket from the third set of signals in the third transmission instance, where decoding of a first information packet from the first set of signals is unsuccessful, means for decoding at least a first information subpacket of the first information packet based on a set of coding parameters, a second information subpacket of the second information packet, and the first parity subpacket, and means for combining, based on decoding the second information packet and the first parity subpacket and at least the first information subpacket, the first information subpacket with one or more other information subpackets of the first information packet to generate the first information packet.

A non-transitory computer-readable medium storing code for wireless communication is described. The code may include instructions executable by a processor to receive a set of signals in a set of multiple transmission instances, the set of signals including a first set of signals in a first transmission instance, a second set of signals in a second transmission instance, and a third set of signals in a third transmission instance, decode a second information packet from the second set of signals in the second transmission instance and a first parity subpacket from the third set of signals in the third transmission instance, where decoding of a first information packet from the first set of signals is unsuccessful, decode at least a first information subpacket of the first information packet based on a set of coding parameters, a second information subpacket of the second information packet, and the first parity subpacket, and combine, based on decoding the second information packet and the first parity subpacket and at least the first information subpacket, the first information subpacket with one or more other information subpackets of the first information packet to generate the first information packet.

In some examples of the method, apparatuses, and non-transitory computer-readable medium described herein, each information packet of each transmission instance may be segmented into a first determined number of information subpackets, and the first parity subpacket may be encoded using a number of subpackets that corresponds to the first determined number of information subpackets, and each information subpacket used to encode the first parity subpacket may be from a different information packet. In some examples of the method, apparatuses, and non-transitory computer-readable medium described herein, a second determined number of subpackets in the third transmission instance include the first determined number of information subpackets of a third information packet and one or more parity subpackets.

In some examples of the method, apparatuses, and non-transitory computer-readable medium described herein, the decoding at least the first information subpacket may include operations, features, means, or instructions for determining the first information subpacket based on successfully decoded subpackets from a diagonal mapping of information subpackets and parity subpackets in a coding table. In some examples of the method, apparatuses, and non-transitory computer-readable medium described herein, each of the first information packet and the second information packet may be an aggregated packet of two or more data packets that include a data payload.

Some examples of the method, apparatuses, and non-transitory computer-readable medium described herein may further include operations, features, means, or instructions for receiving control information that indicates the set of coding parameters. In some examples of the method, apparatuses, and non-transitory computer-readable medium described herein, the set of coding parameters includes one or more of a number of information subpackets that each information packet is segmented into, a total number of subpackets that are transmitted in each transmission instance, or a number of parity subpackets that are transmitted in each transmission instance.

In some examples of the method, apparatuses, and non-transitory computer-readable medium described herein, each of the first information packet, the second information packet, and the first parity subpacket, include an indication of an information payload or a parity payload. In some examples of the method, apparatuses, and non-transitory computer-readable medium described herein, each of the first information packet, the second information packet, and the first parity subpacket, include an indication of a table index of a coding table, and the table index of the coding table indicates an information payload or a parity payload.

DETAILED DESCRIPTION

Figure 1:
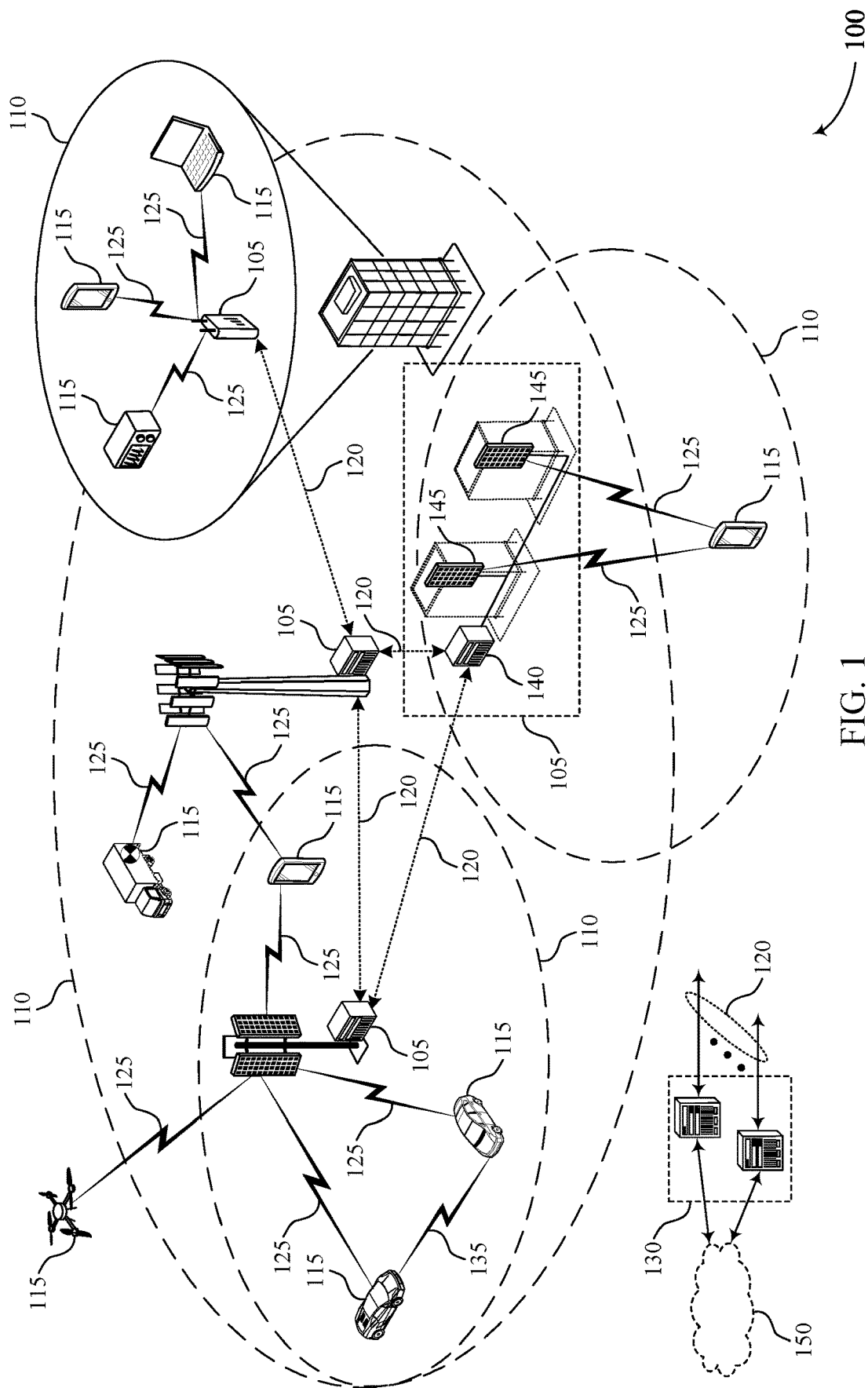
FIG. 1 illustrates an example of a wireless communications system that supports outer coding techniques in wireless communications in accordance with aspects of the present disclosure.

Techniques discussed herein relate to outer coding schemes in wireless communications in which transmissions, such as physical (PHY) layer transmissions, may include both data and parity (e.g., data bits and parity bits). A receiving device (e.g., a user equipment (UE) or base station) may use the data and the parity to recover one or more portions of a data packet that are not successfully received based on an outer coding scheme. The outer coding scheme may provide that the data and the parity are included in a single transmission, such as a single physical layer transmission. In some cases, data packets may be segmented into multiple subpackets, and coding may be performed across different subpackets of different data packets (e.g., in a diagonal coding pattern).

In various aspects discussed herein, transmission, such as physical layer transmissions, may contain data subpackets and parity subpackets, which may balance an input and an output load of a buffer (e.g., a layer two (L2) decoding buffer at the receiver) during decoding. For example, a random access memory in a wireless modem of a receiving device (e.g., a UE) may have a size that is determined based on a number of feedback processes (e.g., hybrid automatic repeat request (HARQ) processes) that are supportable by the modem and a L2 buffer that is used to store out-of-order packets in a radio link control (RLC) or packet data convergence protocol (PDCP) layer while waiting for packets that are being retransmitted in accordance with the feedback processes. The buffer size associated with feedback processes may be determined based on a transmission time interval length and a number of feedback processes, and is used to store soft log likelihood ratio (LLR) bits corresponding to failed transport blocks (TBs) that are waiting for retransmission. The L2 buffer size may be determined by a RLC round trip latency (e.g., 40 ms as specified in some 5G or NR standards for 30K subcarrier spacing (SCS)). As SCS increases and throughput increases advance, such memory requirements can grow relatively large, and can add cost to a modem. Outer coding techniques as discussed herein may substantially reduce memory requirements. Further, techniques as discussed herein that provide both data and parity is a same physical layer transmission may balance an amount of data that is to be transferred into and out of the L2 buffer, and may alleviate input/output (I/O) bottlenecks that may occur if multiple packets of data are transmitted separately from associated parity packets.

In some cases, data packets may be divided (e.g., segmented) into multiple subpackets, and coding may be performed across different subpackets of respective packets in accordance with an outer coding technique. Each transmission in the physical layer may then contains both information subpackets and parity subpackets to balance input/output load during decoding, as the parity subpackets may be transmitted throughout, rather than as separate packets transmitted following a set of data packets (e.g., a set of transport blocks (TBs)). In some cases, the data and parity subpackets belonging to a same codeword are transmitted in different physical layer transmissions (e.g., in different slots) to provide diversity. For example, a transmitting device (e.g., UE or base station) may segment each packet of a plurality of data packets into K pieces. The device may then use one subpacket from each of K packets, and code across the K subpackets to generate N coded subpackets (e.g., parity subpackets). In each transmission slot, K data subpackets may be transmitted, along with N coded parity subpackets. In some cases, a coding or interleaving table may be used to map data subpackets and parity subpackets, and the data subpackets may be mapped into K rows and X columns (e.g., where X≥K), where the mapping is column-first and row-second (e.g., a first data packet is mapped to a first column, and K subpackets of the first data packet are mapped into K rows of the first column). Then, encoding may be performed across diagonals of the K by X table, and the encoded parity subpackets may be transmitted in a transmission that does not contain the data subpackets (e.g., in a transmission of a different slot or frequency than associated data subpackets).

Particular aspects of the subject matter described herein may be implemented to realize one or more advantages. One implementation may enable coding of data blocks to generate parity blocks, where each physical layer transmission may include both data and parity. In the event that one or more of the data blocks are not successfully decoded, the receiving device may use one or more parity blocks to recover the one or more missing data blocks. Thus a retransmission of an associated TB may be avoided, which may reduce overhead due to control information signaling associated with a retransmission and reduce an amount of resources used for retransmissions. Techniques discussed herein also may result in improved system reliability and more efficient communications (e.g., decreased latency in the system), among other advantages. Further, techniques discussed herein may allow for a reduced memory size at a receiving device (e.g., a reduced amount of memory in a wireless modem of a UE) which may reduce an overall cost of the device. Additionally, techniques discussed herein may allow for more balanced data transfers into and out of the L2 buffer, and may alleviate I/O bottlenecks that may occur if multiple packets of data are transmitted separately from associated parity packets, among other advantages.

Aspects of the disclosure are initially described in the context of wireless communications systems. Examples of various outer coding techniques are then discussed. Aspects of the disclosure are further illustrated by and described with reference to apparatus diagrams, system diagrams, and flowcharts that relate to outer coding techniques in wireless communications.

FIG. 1 illustrates an example of a wireless communications system 100 that supports outer coding techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 or base station 105 may use outer coding techniques as discussed herein to transmit and receive data packets that are encoded according to an outer coding technique. In some cases, the outer coding technique provides for data and parity to be included in a single physical layer transmission. In some cases, data packets may be segmented into multiple subpackets, and coding is performed across different subpackets of different data packets (e.g., in a diagonal coding pattern). Each transmission in the physical layer may contain both data subpackets and parity subpackets, which may balance an input and an output load of a buffer (e.g., a layer two (L2) decoding buffer at the receiver) during decoding.

Figure 2:
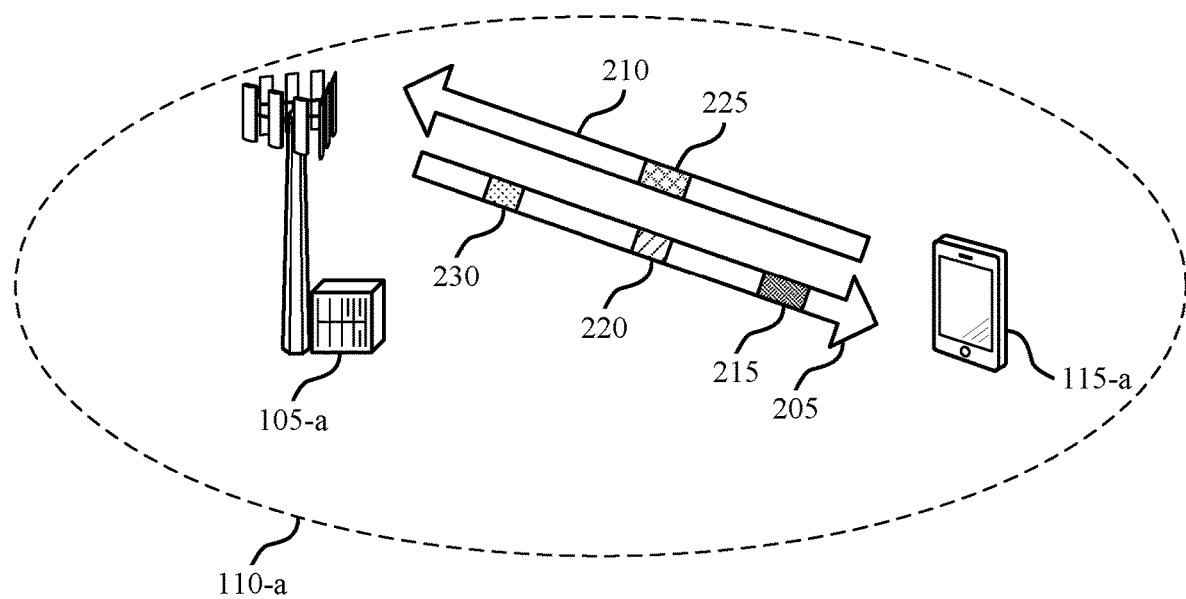
FIG. 2 illustrates an example of a portion of a wireless communications system that supports outer coding techniques in wireless communications in accordance with aspects of the present disclosure.

FIG. 2 illustrates an example of a wireless communications system 200 that supports outer coding techniques in wireless communications in accordance with aspects of the present disclosure. In some examples, wireless communications system 200 may implement aspects of wireless communications system 100 and may include UE 115-a and base station 105-a, which may be examples of a UE 115 and a base station 105 described with reference to FIG. 1. Base station 105-a may serve the UE 115-a, and one or more other UEs or other devices within a coverage area 110-a of the base station 105-a.

The UE 115-a may communicate with the base station 105-a using a downlink communication link 205 (or multiple links), and an uplink communication link 210 (or multiple links), using FDD or TDD communications. In some cases, the base station 105-a may provide configuration information 215 to the UE 115-a. The configuration information 215 may include, for example, a configuration for outer link coding in accordance with techniques discussed herein. In some cases, one or more TBs of downlink data may be transmitted by the base station 105-a to the UE 115-a, which may be encoded to generate one or more parity blocks and one or more data blocks that are transmitted in downlink transmissions 220. The UE 115-a may attempt to decode the downlink transmissions 220, and generate feedback, such as acknowledgment/negative-acknowledgment (ACK/NACK) feedback 225, that is transmitted to the base station 105-a. Based on the ACK/NACK feedback 225, the base station 105-a may initiate one or more retransmissions 230. As discussed herein, outer coding techniques may be implemented to reduce a number of retransmissions 230 that may be needed, which may reduce an amount of memory needed at the UE 115-a to buffer received TBs while waiting for the one or more retransmissions 230.

For example, outer coding schemes may be implemented in which two or more data blocks are encoded together according to the outer coding scheme (e.g., an XOR with or without weighting factors, polynomial, or other coding operation) to generate an outer coded block that may be used as a repair code block to recover one or more data blocks that may not be successfully decoded at the UE 115-a. In some examples, such an outer code may provide an erasure code that is a forward error correction (FEC) code under the assumption of bit (or packet in the outer coding application) erasures (rather than bit/packet errors), which transforms a message of k symbols into a longer message (code word) with n symbols such that the original message can be recovered from a subset of the n symbols. The fraction r=k/n may be referred to as the code rate. The fraction k'/k, where k' denotes the number of symbols required for recovery, and may be referred to as reception efficiency. In some cases, the outer coding may be a maximum distance separable (MDS) code, where a subset up to k symbols of the n coded symbols of the code can be recovered.

In some cases, outer coded blocks may be transmitted with the set of data blocks such that PHY layer transmissions include both data and parity blocks. When one of the data blocks is not successfully decoded by UE 115-a, that data block can be recovered by reversing the outer coding process using a combination of a successfully received data block and the successfully received outer coded block. Thus, the inclusion of the outer coded block with the data blocks may increase the probability that the UE 115-a receives the data block. This use of outer coding may reduce the number of retransmissions 230 at the base station 105-a, thereby increasing network efficiency.

In some cases, the configuration information 215 may include information related to the outer coding scheme that is used for communications. It is noted that while various examples discussed herein reference downlink transmissions to UE 115-a, outer coding techniques of various aspects may be used for uplink transmissions from the UE 115-a to the base station 105-a. It is noted that, as used herein, the use of the term "packet" denotes the unit of data on which the outer code may be applied to. For example, a packet can refer to a TB if outer code is applied at the MAC layer, or an RLC/PDCP PDU if outer code is applied at L2. Original packets generated from upper layers are referred to herein as data/systematic/information packets, and the packets that are generated from the coding scheme are referred to as parity packets. Thus, a "packet" may be analogous to a "bit" in case the code is applied at the physical layer. An "outer codeword" or simply "codeword" includes the information packets and parity packets that are involved in the same encoding function.

In some cases, the configuration information 215 may include one or more block code parameters (e.g., number of codeword packets (N), number of parity packets (L), and number of data packets (K)). Further, in some cases, the configuration information may enable or disable outer coding (e.g., outer coding may be enabled or disabled based on channel conditions, a rate of NACKs that are being generated, etc.), and enable or disable outer coding using packet segmentation. Configuration information 215 may be provided in RRC signaling, in a medium access control (MAC) control element (CE), in downlink control information (DCI), or any combinations thereof. In some cases, for each packet or subpacket, a header may indicate whether this packet or subpacket contains data or parity bits. Further, in some cases, the configuration information 215 may include parameters for a coding table that is to be used for communications, as is discussed in more detail with reference to FIGS. 5 through 10. In such cases, for each packet or subpacket, the transmitter may also indicate to the receiver the column/row/diagonal index of the packet/subpacket within the coding table; and the relation between two packets can be determined based on the indicated index of the corresponding packets. For example, the transmitter may first map packets to the table, and then determine the row/column/diagonal index of the corresponding packet, and the receiver may use the row/column/diagonal index to map a received packet or subpacket to the coding table, and then perform decoding based on the location of the packets or subpackets inside the table.

Figure 3:
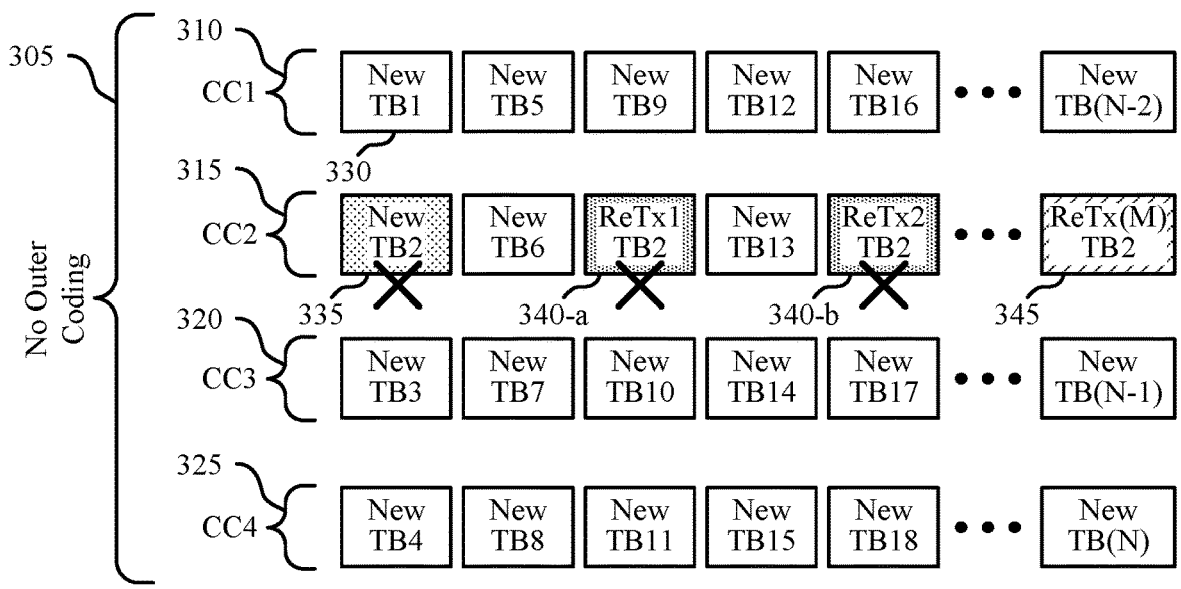
FIG. 3 illustrates an example of a recovery of a missing transport block with and without outer coding, in accordance with aspects of the present disclosure.
Figure 3:
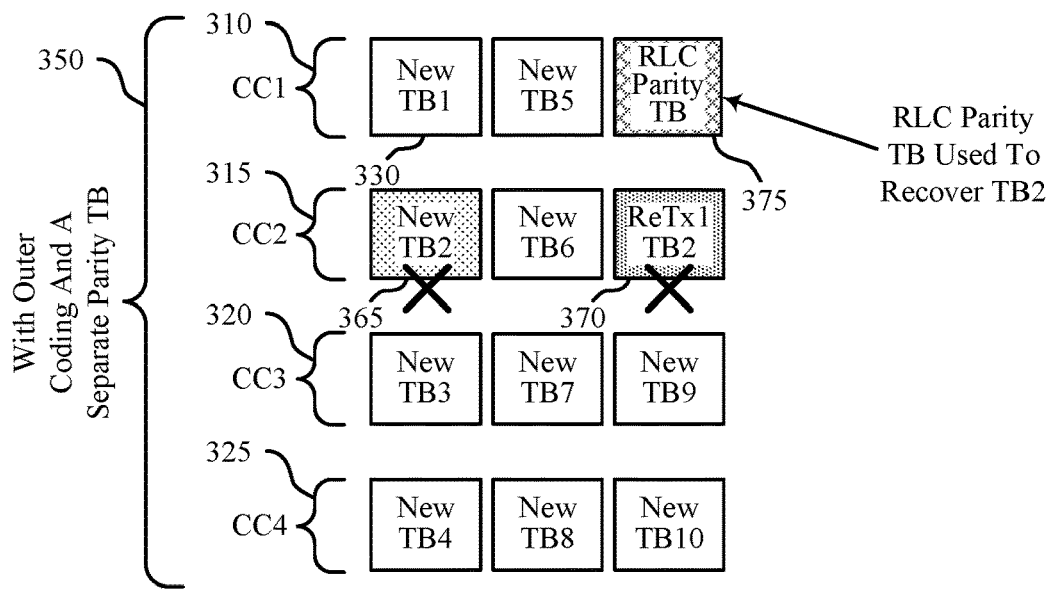

FIG. 3 illustrates an example of a recovery of a missing TB with and without outer coding 300 that supports outer coding techniques in wireless communications in accordance with aspects of the present disclosure. In some examples, recovery of a missing TB may be implemented in aspects of wireless communications systems 100 or 200.

In a first example, no outer coding is applied to a set of TBs 330 that may be transmitted using multiple component carriers (CCs) that include a first CC 310, a second CC 315, a third CC 320, and a fourth CC 325. In this example, the second CC 315 may experience poor channel conditions or interference such that a second TB 335 is not successfully decoded at the receiving device (e.g., a UE 115 as discussed herein). A NACK feedback may be provided for the second TB 335 that triggers a first retransmission 340-a of the TB. In this example, a second retransmission 340-b may also be transmitted (e.g., based on a subsequent NACK), and so on, until a successful reception 345 of the TB. In this example, a HARQ buffer may be used to store the soft LLR bits corresponding to failed instances of second TB 335 and 340 and waiting for HARQ retransmission. As discussed herein, the HARQ and L2 buffer may define the memory (or buffer) footprint in the modem design, with the HARQ buffer size determined by transmission time interval (TTI) length and the number of supportable HARQ processes, and the L2 buffer used to store out-of-order packets in the RLC/PDCP layer before correctly receiving the packets that are earlier in the TB sequence (e.g., the L2 buffer size may be determined by RLC round trip latency (e.g., 40 ms in 5G for 30 Khz SCS). Thus, in first example 305, all TBs after the second TB 335 may be buffered in the L2 buffer until the successful reception 345 of the TB through HARQ retransmission.

In second example 350, outer coding may be used for TBs 330, and a RLC parity TB 375 may be used to recover a missing second TB 365 and associated retransmission TB 370. Using such a technique may allow for a reduced L2 buffer, as fewer TBs 330 are buffed to account for out-of-order TBs. However, since the outer code of the second example 350 is applied across different packets, when decoding an outer code the receiver may need to move the received packets in and out from the memory, which can be a bottleneck that limits the performance of the outer code.

Figure 4:
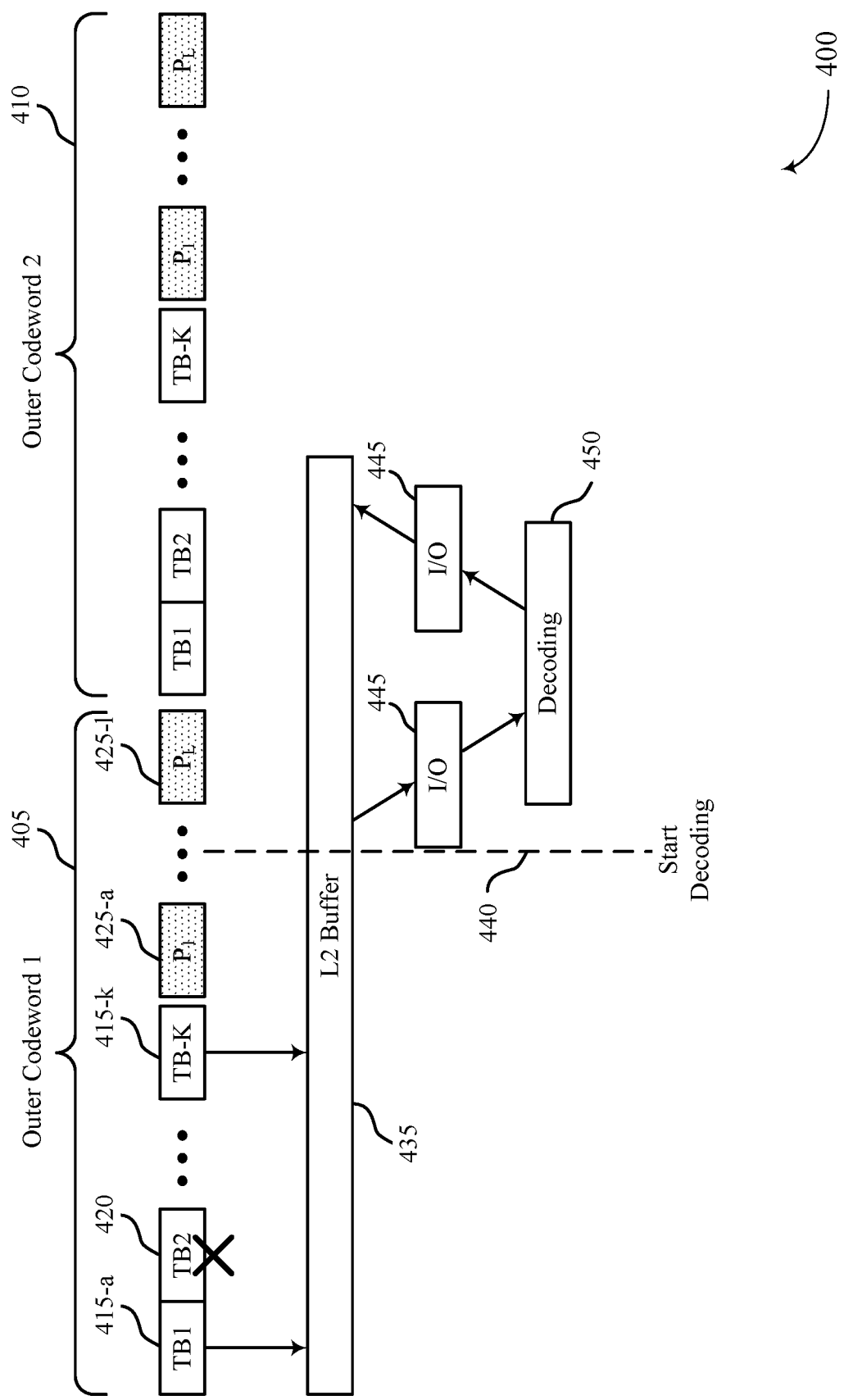
FIG. 4 illustrates an example of layer two (L2) buffering and decoding in accordance with aspects of the present disclosure.

An example of such input/output is illustrated in FIG. 4. In some aspects of the disclosure, as discussed with reference to FIGS. 5 through 10, parity packets may be generated and transmitted in a same physical layer transmission as data packets, which may provide for more balanced I/O, and may enhance processing efficiency at the receiver. In some cases, a UE may be configured for communications that use no outer coding, that use outer coding with separate parity TBs 375, or that use outer coding with packet segmentation such as illustrated in FIGS. 5 through 10.

FIG. 4 illustrates an example of a layer two (L2) buffering and decoding 400 that supports outer coding techniques in wireless communications in accordance with aspects of the present disclosure. In some examples, L2 buffering and decoding 400 may be implemented in aspects of wireless communications systems 100 or 200.

In this example, a first outer codeword 405 may be generated based on K TBs 415-$a$ through 415-$k$, and L parity blocks 425-$a$ through 425-$l$. Likewise, a second outer codeword 410 may be generated in a similar manner. A receiving device, such as a UE or base station, may buffer LLRs associated with each TB in L2 buffer 435 and, at time 440 after receiving a first parity block 425-$a$, may attempt to recover a missing TB 420 (e.g., that is not successfully decoded. In such cases, I/Os 445 may be used to transfer the received TBs 415 and parity blocks 425 for decoding 450 and re-buffering in the event of unsuccessful decoding. For example, each outer codeword 405 and 410 may contain 30 slots worth of data, which may be, for example, 120 packets (or TBs) scheduled over four CCs. The packets may be loaded to the decoder at 450 from the L2 buffer 435 after enough correctly received packets are received, at 440. In some examples that may use a 10 Gbps throughput, 125 Mb thus is loaded to the decoder (i.e., K correctly decoded packets) at once before decoding, and 32 Mb is provided back to the L2 buffer 435 after decoding (L decoded packets). In cases where the memory-access bandwidth is 40 Gbps, such transfers consume 7.2 slots, which may result in 24% of extra memory being needed due to I/O latency.

Thus, bursts of a relatively large amount of L2 buffer 435 data may be exchanged between the L2 buffer and the decoding component as part of the outer coding process. As discussed herein, in some cases TBs 415 may be segmented and multiple subpackets of different packets may be used to generate a parity subpacket, such as illustrated for one example in FIG. 5. Such techniques may help to balance the I/O load, which may reduce an amount of L2 buffer 435 needed, may reduce latency, and enhance processing efficiency.

Figure 5:
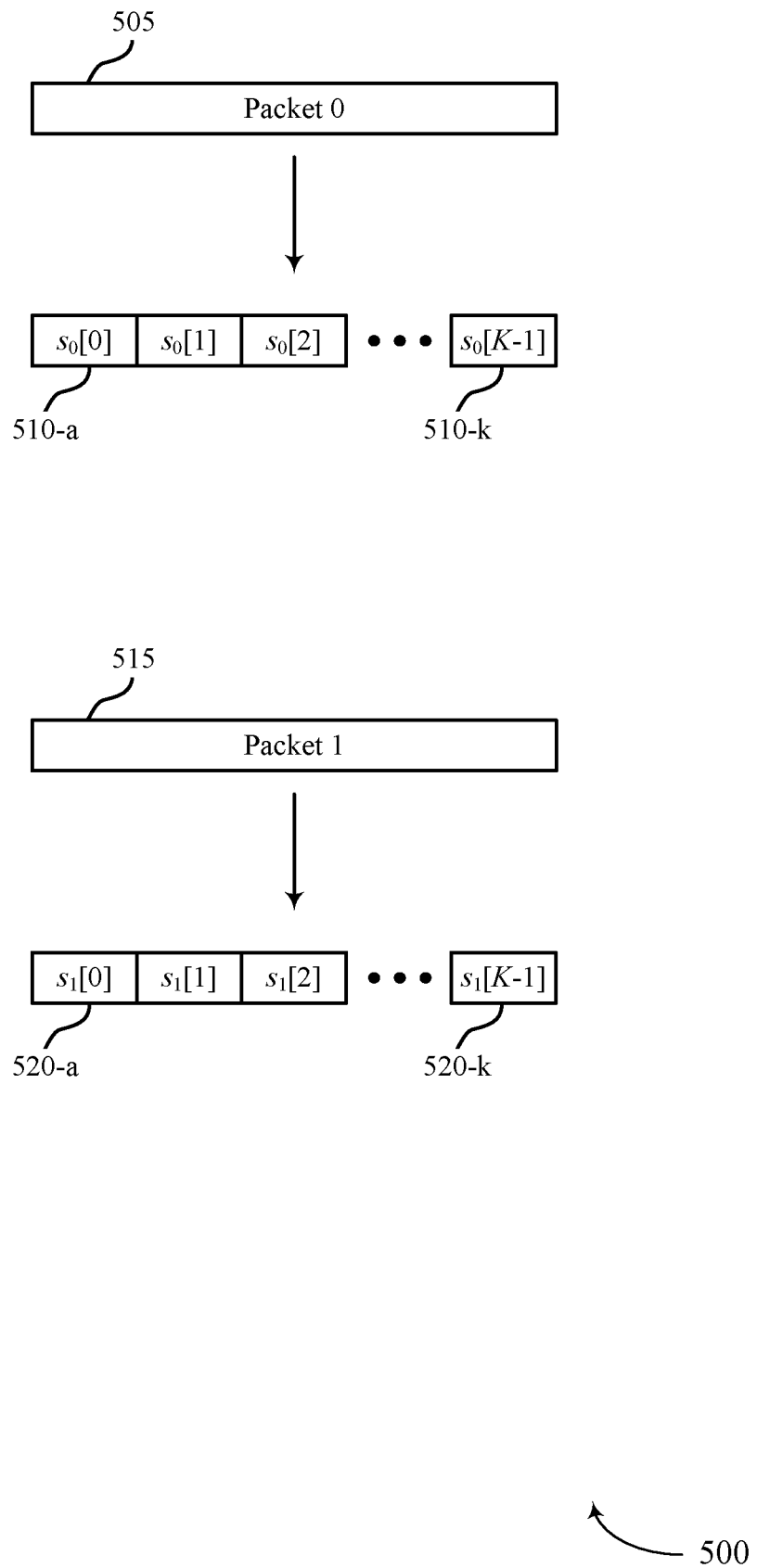
FIG. 5 illustrates an example of packet segmentation that supports outer coding techniques in wireless communications in accordance with aspects of the present disclosure.

FIG. 5 illustrates an example of a packet segmentation 500 that supports outer coding techniques in wireless communications in accordance with aspects of the present disclosure. In some examples, packet segmentation 500 may be implemented in aspects of wireless communications systems 100 or 200.

In this example, a first packet 505 (e.g., a first TB) may be segmented into K subpackets 510-$a$ through 510-$k$. Likewise, a second packet 515 may be segmented into K subpackets 520-$a$ through 520-$k$. In this example, an outer codeword may be encoded using different subpackets 510 and 520 from different packets 505 and 515, to generate one or more parity subpackets. In some cases, the coding may be based on a (systematic) block code, and each transmission in the physical layer may include both information subpackets and parity subpackets (which are parities of previously generated information subpackets), to balance I/O load. Further, information and parity subpackets belonging to a same codeword may be transmitted in different transmissions to have diversity. In this example, the first packet 505 and the second packet 515 may be denoted as $s_i=[s_i[0], s_i[1], \ldots s_i[K-1]]$, and $\{s_i[k]\}_{0 \le k \le (K-1)}$ are the K subpackets of the packet i. In some cases, such as illustrated in the example of FIG. 6, subpackets may be diagonally encoded such that subpackets of different packets are encoded, and a parity subpacket is transmitted with a separate packet than associated with the parity subpacket.

Figure 6:
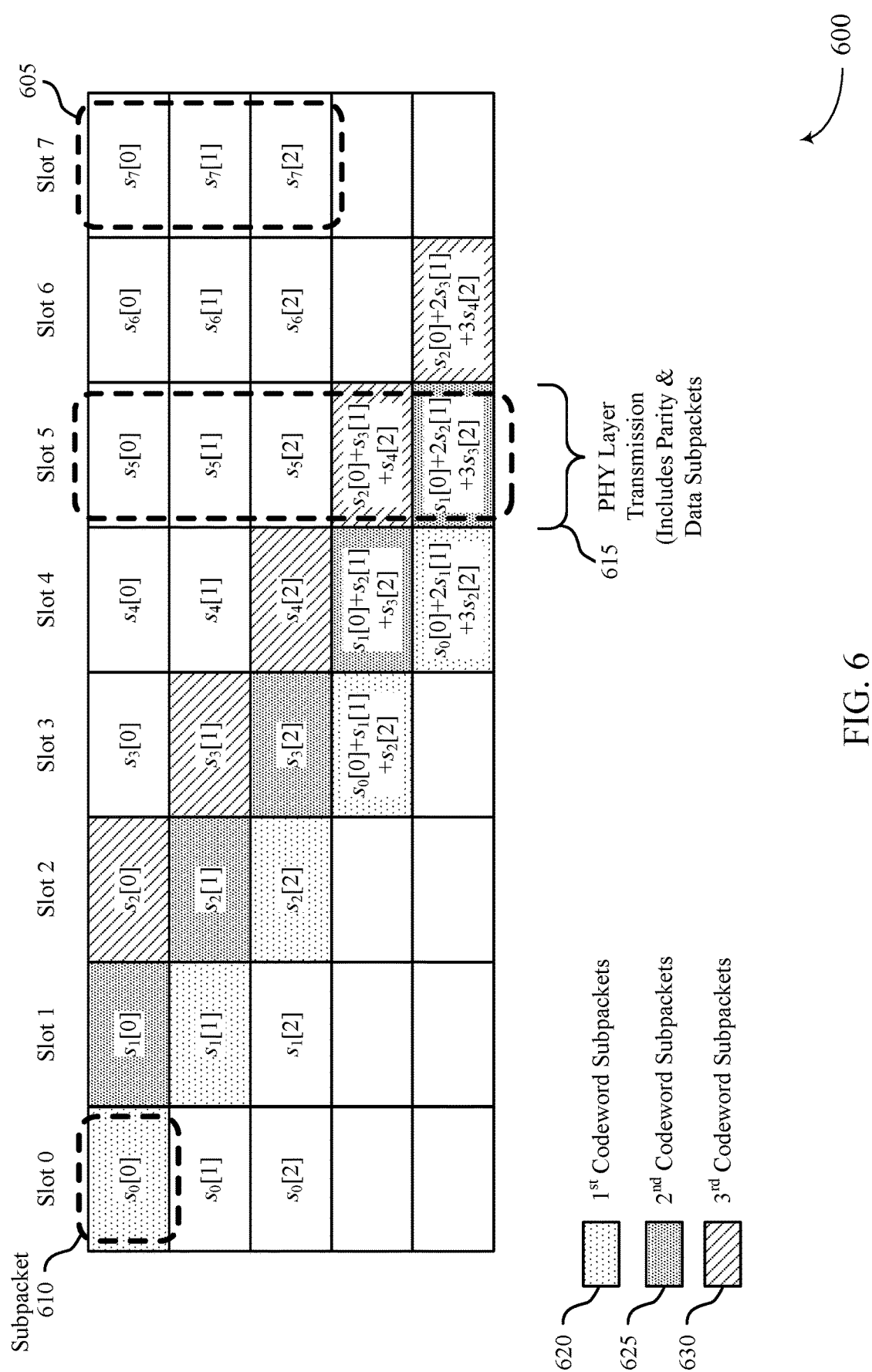
FIGS. 6 through 10 illustrate examples of data packet encoding that support outer coding techniques in wireless communications in accordance with aspects of the present disclosure.

FIG. 6 illustrates an example of data packet encoding 600 that supports outer coding techniques in wireless communications in accordance with aspects of the present disclosure. In some examples, data packet encoding 600 may be implemented in aspects of wireless communications systems 100 or 200.

In this example, a number of data packets 605 may be coded, where each data packet is segmented into sub-packets 610. For example, if the size of a packet 605 is 1, then the size of a subpacket 610 is 1/K. In the example of FIG. 6, diagonal coding may be used to code across diagonals of a coding table, such that a first codeword 620 is encoded from multiple different data packets and parity subpackets in a diagonal relationship. Likewise, second codeword 625 and third codeword 630 may have subpackets for consecutive adjacent subpackets 610. In the example of FIG. 6, a (3, 5) systematic linear code may be implemented, in which two parity subpackets may be generated as $p_0=S_0[0]+S_1[0]+S_2[2]$ and $p_1=S_0[0]+2S_1[1]+3S_2[2]$, with the parity subpackets placed in adjacent diagonals to the encoded information subpackets. Thus, in this example, a physical layer transmission 615 (e.g., in a slot) may include three information subpackets of the slot and two parity subpackets associated with prior slots (e.g., $S_5[0], S_5[1], S_5[2], S_2[0]+S_3[0]+S_4[2], S_1[0]+2S_2[1]+3S_3[2]$). That is, three information bits/subpackets (e.g., $S_5[0], S_5[1], S_5[2]$) and two parity bits/subpackets (e.g., $S_2[0]+S_3[0]+S_4[2], S_1[0]+2S_2[1]+3S_3[2]$) are transmitted as 5 bits/subpackets in the physical layer transmission 615, in which the parity bits/subpackets provide parity that is for information bits/packets from different slots (in this example, parity for $S_1, S_2, S_3$, and $S_4$ is transmitted with information bits/subpackets for $S_5$). It is noted that while slots are illustrated in various examples as discussed herein, the transmissions associated with packets or subpackets may be in different frequency resources, different time resources (e.g., slots), different spatial resources, or any combinations thereof, which may be generally referred to herein as transmission instances or transmission occasions.

Thus, in some aspects, outer coding may be performed for data packets, where each data packet may be segmented into K pieces, one subpacket of each packet is selected and coding across K subpackets from K (consecutive) packets is used to generate N coded subpackets (where a number of parity packets, L, is N−K). In each physical layer transmission, some information subpackets and some coded parity subpackets are included; where the coded parity subpackets are parities of one or more other information subpackets (e.g., previously generated information subpackets or information subpackets from information packets with a smaller sequence number). The data subpackets and parity subpackets are mapped into K rows and N columns (where N≥K), where the mapping is column-first and row-second, such that the mapping first maps a first packet to a first column, and maps the associated K data subpackets of the first packet into the K rows of the first column). Then, encoding across each diagonals of the K by N table may be performed. Each column of data subpackets and parity subpackets may be transmitted to the receiver together (e.g., in a same transmission occasion, or across consecutive transmission occasions), where the transmitted encoded parity subpackets are not based on the concurrently transmitted data subpackets. Such techniques may provide transmission diversity of data subpackets and parity subpackets. In various prior outer coding techniques, the outer code may be either applied across different packets or across different subpackets of a same packet, and techniques such as provided herein may thus further enhance diversity through coding of portions of different packets to generate parity subpackets. In the event of one or more unsuccessfully received packets, the receiver may recover subpackets from the different parity subpackets, such as discussed with reference to the example of FIG. 7.

Figure 7:
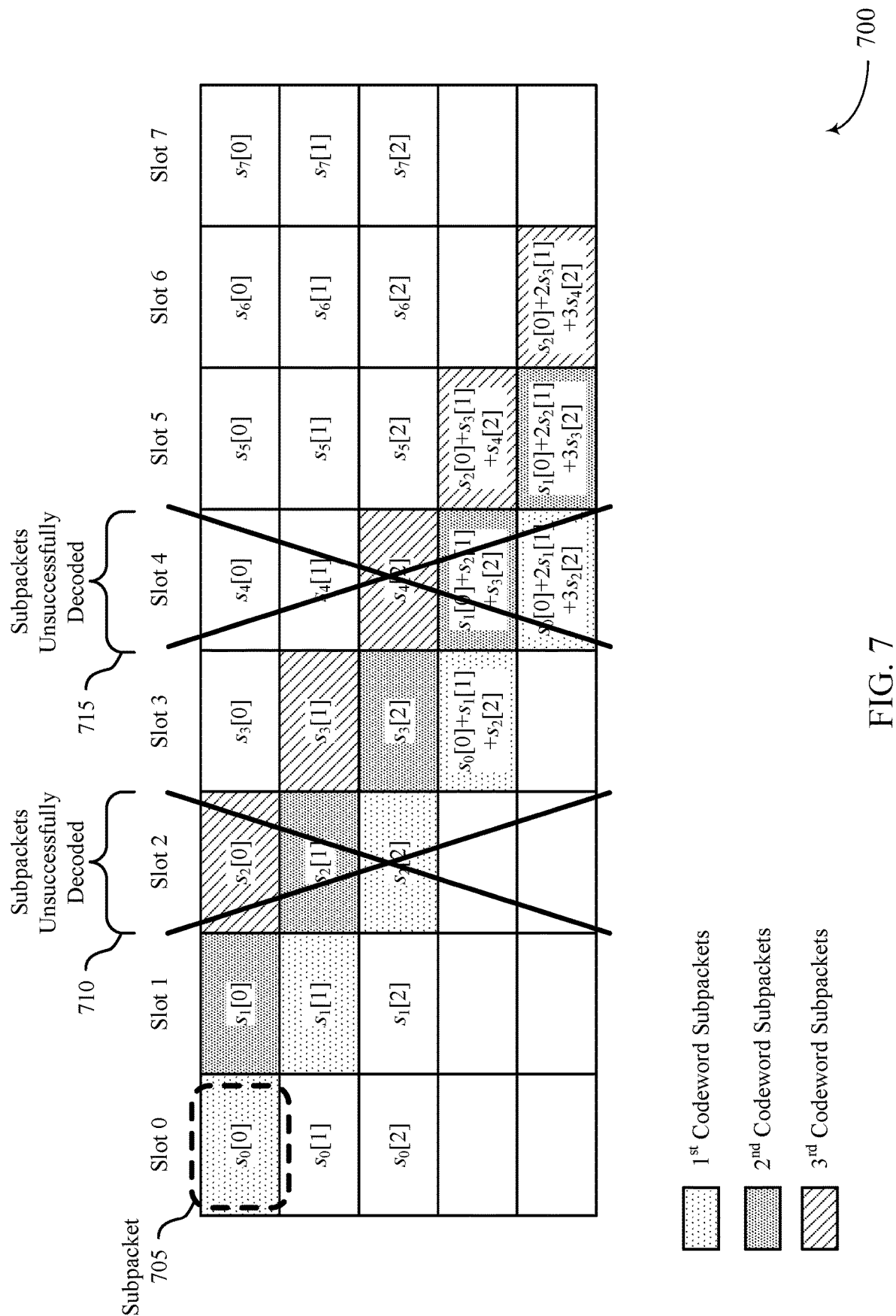

FIG. 7 illustrates an example of data packet encoding 700 that supports outer coding techniques in wireless communications in accordance with aspects of the present disclosure. In some examples, data packet encoding 700 may be implemented in aspects of wireless communications systems 100 or 200.

In this example, a number of data packets may be coded, where each data packet is segmented into sub-packets 705, and diagonal coding may be used to generate and transmit parity subpackets, such as described with reference to FIG. 6. In this example, a third data packet (e.g., $S_2$) of a third slot (e.g. slot 2), and a fifth data packet (e.g., $S_4$) of a fifth slot (e.g., slot 4), may be unsuccessfully decoded. Thus, the receive (e.g., a UE) may attempt to repair each lost packet. In this example, to repair $S_2[2]$, the receiver may read $S_3[0]$, $S_1[1]$, $S_0[0]+S_1[1]+S_2[2]$, and compute $S_2[2]$ based on the coding scheme. To repair $S_2[1]$, the receiver may read $S_1[0]$, $S_3[2]$, $S_1[0]+2S_2[1]+3S_3[2]$, and compute $S_2[1]$ based on the coding scheme. To repair $S_2[0]$, the receiver may read $S_3[1]$, $S_2[0]+S_3[1]+S_4[2]$, and $S_2[0]+2S_3[1]+3S_4[2]$, and compute $S_2[0]$ based on the coding scheme. Thus, the sub-packets $S_2[2]$, $S_2[1]$, $S_2[0]$ are repaired in three different slots, thereby distributing the memory-access load (e.g., I/O cost) uniformly across the slots such that per slot only one packet (e.g., K=3 subpackets) needs to be read from the memory, and at most L/K packets need to written back to the memory.

In conventional outer coding schemes, a transmission may include either information bits or parity bits, and in the worst case the receiver loses L information packets and may need to read K packets all at once. In some cases, the receiver may identify that only parity packets are missing, and in such cases will not need any additional I/O, as the data is already present. Thus, the I/O requirement to repair the lost packets in the conventional scheme depends on whether information or parity packets are lost. By providing both data and parity bits in each physical layer transmission in accordance with various techniques described herein, each lost transmission contains some information subpackets and some parity subpackets, and therefore packet loss is much more uniform. The K packets I/O are thus evenly distributed across each slot, and thus one unit of packet read per slot is needed instead of K units of packet read from memory in the worst case with a conventional scheme. It is noted that the example of FIG. 7 is one example of numerous different examples of ordering of subpackets, and different permutations of the first K rows in the table may be implemented, with the parities generated accordingly by coding across the particular permutation. One example of such different ordering is illustrated in the example of FIG. 8.

Figure 8:
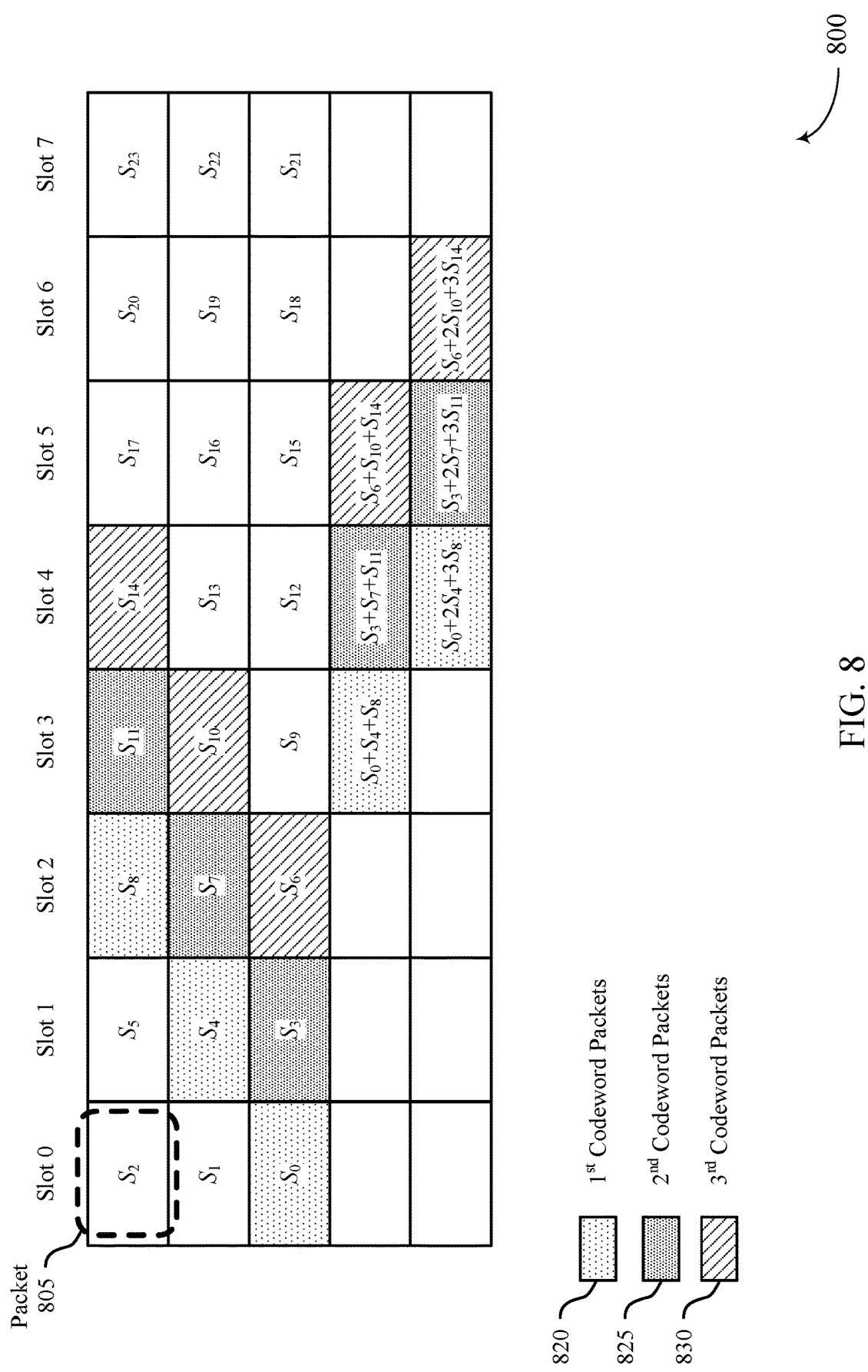

FIG. 8 illustrates an example of data packet encoding 800 that supports outer coding techniques in wireless communications in accordance with aspects of the present disclosure. In some examples, data packet encoding 800 may be implemented in aspects of wireless communications systems 100 or 200.

In this example, a number of data packets may be coded, where each data packet is a relatively small packet, and instead of segmenting a packet into subpackets, multiple packets may be grouped into a super-packet 805 (which may simply be referred to as a packet). Outer coding such as discussed in FIG. 6 may be applied to generate parity packets. In this example, the ordering of packets for diagonal coding may be a different order than that of FIG. 6, such that the first codeword 820, second codeword 825, and third codeword 830 are generated as illustrated in FIG. 8. In this example, each K packets are grouped into a group for a slot, and coding is performed across packets within different groups; and in each transmission N packets (including a group of K information packets and N-K parity packets) are transmitted. In the event that one or more groups of packets are lost (e.g., unsuccessfully decoded), the missing packets may be recovered according to the outer coding technique similarly as discussed with reference to FIG. 7.

Figure 9:
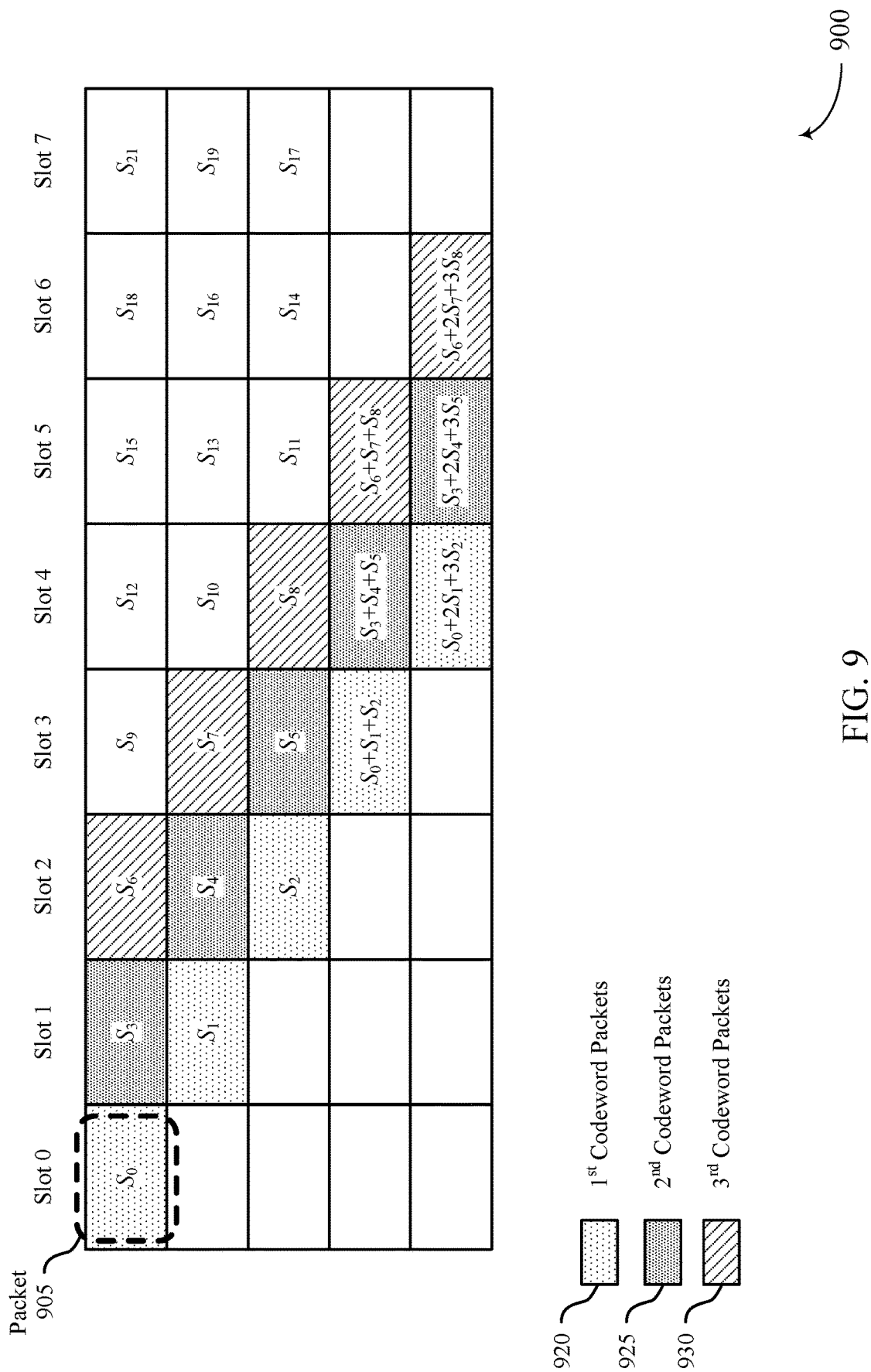

FIG. 9 illustrates another example of data packet encoding 900 that supports outer coding techniques in wireless communications in accordance with aspects of the present disclosure. In some examples, data packet encoding 900 may be implemented in aspects of wireless communications systems 100 or 200.

In this example, a diagonal-in column-out interleaver may be implemented. In this example, a table may be initialized with N rows and more than N columns, with each cell corresponding to a packet 905. In some cases, the transmitter may first encode the packets 905 according to conventional outer coding (e.g., for every group of K packets, encode them using a (K,N) block code to generate N packets, including a set of first codeword packets 920, a set of second codeword packets 925, and a set of third codeword packets 930). Then the transmitter writes every group of N coded packets into one diagonal of the table, and the next group of N coded packets are mapped to the diagonal next to the previous diagonal. When transmitting the packets, the transmitter reads the packets (e.g., from a transmit buffer) column by column (e.g., in slot 4, the transmitter may transmit $[S_{12}, S_{10}, S_8, S_3+S_4+S_5, S_0+2S_1+3S_2]$).

Figure 10:
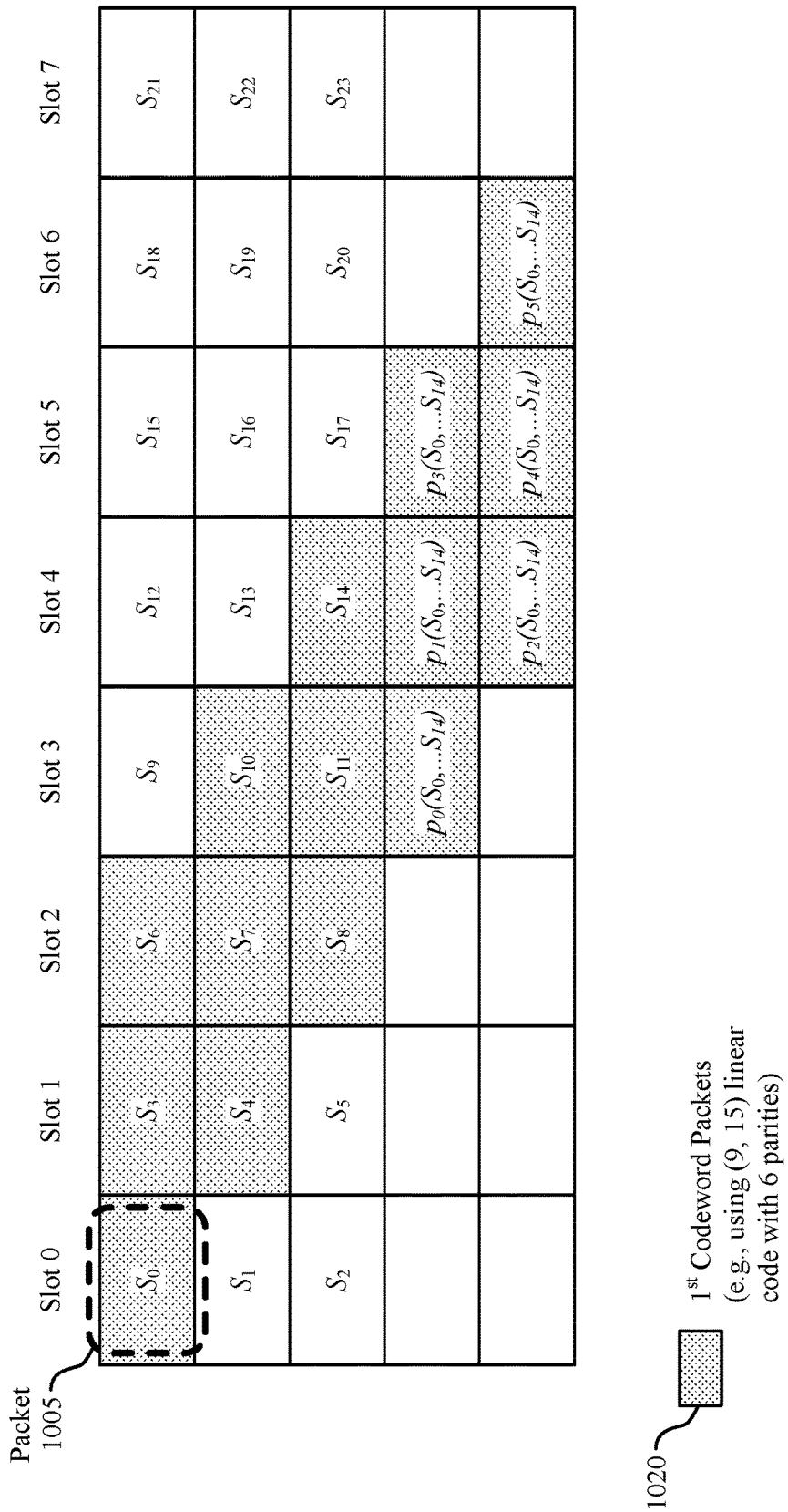

FIG. 10 illustrates still a further example of data packet encoding 1000 that supports outer coding techniques in wireless communications in accordance with aspects of the present disclosure. In some examples, data packet encoding 1000 may be implemented in aspects of wireless communications systems 100 or 200.

In this example, coding across multiple diagonals may be implemented. For example, when code lengths (e.g., N and K) are relatively large, it may be cumbersome to divide one packet 1005 into many subpackets, or to group and transmit a large number of packets 1005 in one transmission, and instead it may be beneficial to code across multiple diagonals (e.g., at least two packets from each row of K rows are associated with each parity packet). In this example, transmission still occurs per column, as shown in FIG. 10, with first codeword packets 1020 spanning multiple diagonals (e.g., three diagonals in this example (e.g., which uses a (9,15) linear code with six parities shown by $[p_0, \ldots p_5]$)). While the example of FIG. 10 illustrates coding of packets across multiple diagonals, such techniques also be applied in cases such as the example of FIG. 7 where packets may be segmented into subpackets with coding across subpackets, or the example of FIG. 9 where coding is across packets and a diagonal-in column-out interleaver creates the desired coding pattern. In some cases, combining the technique discussed with reference to FIG. 9 with the technique discussed with reference to FIG. 10 may provide for encoding packets [1, . . . , K] into N coded packets (with K information packets and N-K parity packets), writing these N coded packets into multiple diagonals of a coding table, and then transmitting the data from the table column by column.

Figure 11:
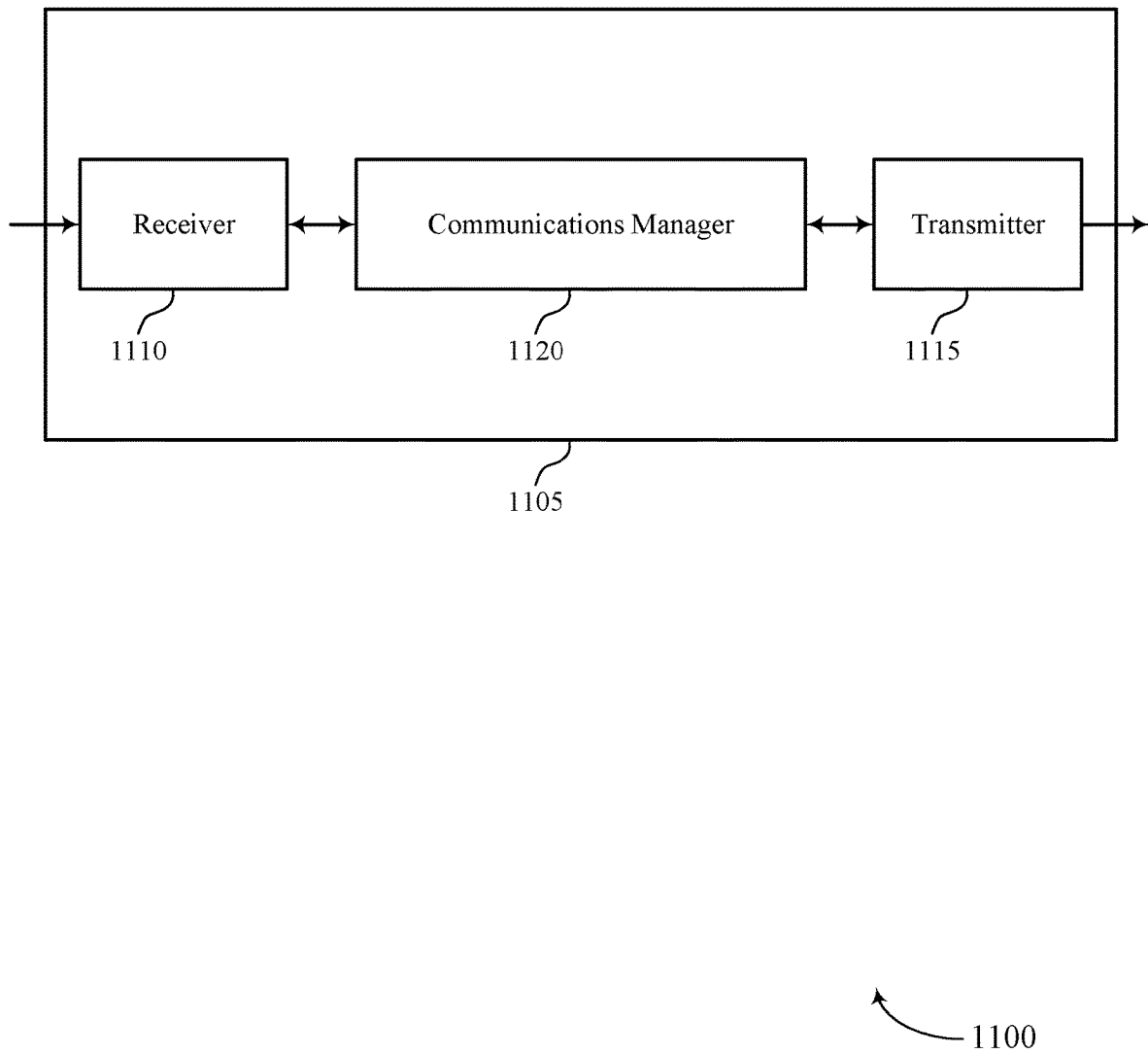
FIGS. 11 and 12 show block diagrams of devices that support outer coding techniques in wireless communications in accordance with aspects of the present disclosure.

FIG. 11 shows a block diagram 1100 of a device 1105 that supports outer coding techniques in wireless communications in accordance with aspects of the present disclosure. The device 1105 may be an example of aspects of a UE 115 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to outer coding techniques in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to outer coding techniques in wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of outer coding techniques in wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first device in accordance with examples as disclosed herein. For example, the communications manager 1120 may be configured as or otherwise support a means for identifying a set of information packets for transmission to one or more receiving devices, each packet of the set of information packets for transmission in a respective transmission instance. The communications manager 1120 may be configured as or otherwise support a means for identifying two or more information subpackets of each packet of the set of information packets. The communications manager 1120 may be configured as or otherwise support a means for encoding a set of multiple information subpackets from the two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance. The communications manager 1120 may be configured as or otherwise support a means for transmitting, to the one or more receiving devices, the first information packet in the first transmission instance, the second information packet in the second transmission instance, and the first parity subpacket in a third transmission instance.

Additionally or alternatively, the communications manager 1120 may support wireless communication in accordance with examples as disclosed herein. For example, the communications manager 1120 may be configured as or otherwise support a means for receiving a set of signals in a set of multiple transmission instances, the set of signals including a first set of signals in a first transmission instance, a second set of signals in a second transmission instance, and a third set of signals in a third transmission instance. The communications manager 1120 may be configured as or otherwise support a means for decoding a second information packet from the second set of signals in the second transmission instance and a first parity subpacket from the third set of signals in the third transmission instance, where decoding of a first information packet from the first set of signals is unsuccessful. The communications manager 1120 may be configured as or otherwise support a means for decoding at least a first information subpacket of the first information packet based on a set of coding parameters, a second information subpacket of the second information packet, and the first parity subpacket. The communications manager 1120 may be configured as or otherwise support a means for combining, based on decoding the second information packet and the first parity subpacket and at least the first information subpacket, the first information subpacket with one or more other information subpackets of the first information packet to generate the first information packet.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for outer coding of data blocks to generate parity blocks where each physical layer transmission may include both data and parity, and a receiving device may use one or more parity blocks to recover the one or more missing data blocks. Thus one or more retransmissions of data blocks may be avoided, which may enhance network efficiency, reduce latency, and improve system reliability. Further, techniques discussed herein may allow for a reduced memory size at a receiving device (e.g., a reduced amount of memory in a wireless modem of a UE) which may reduce an overall cost of the device.

Figure 12:
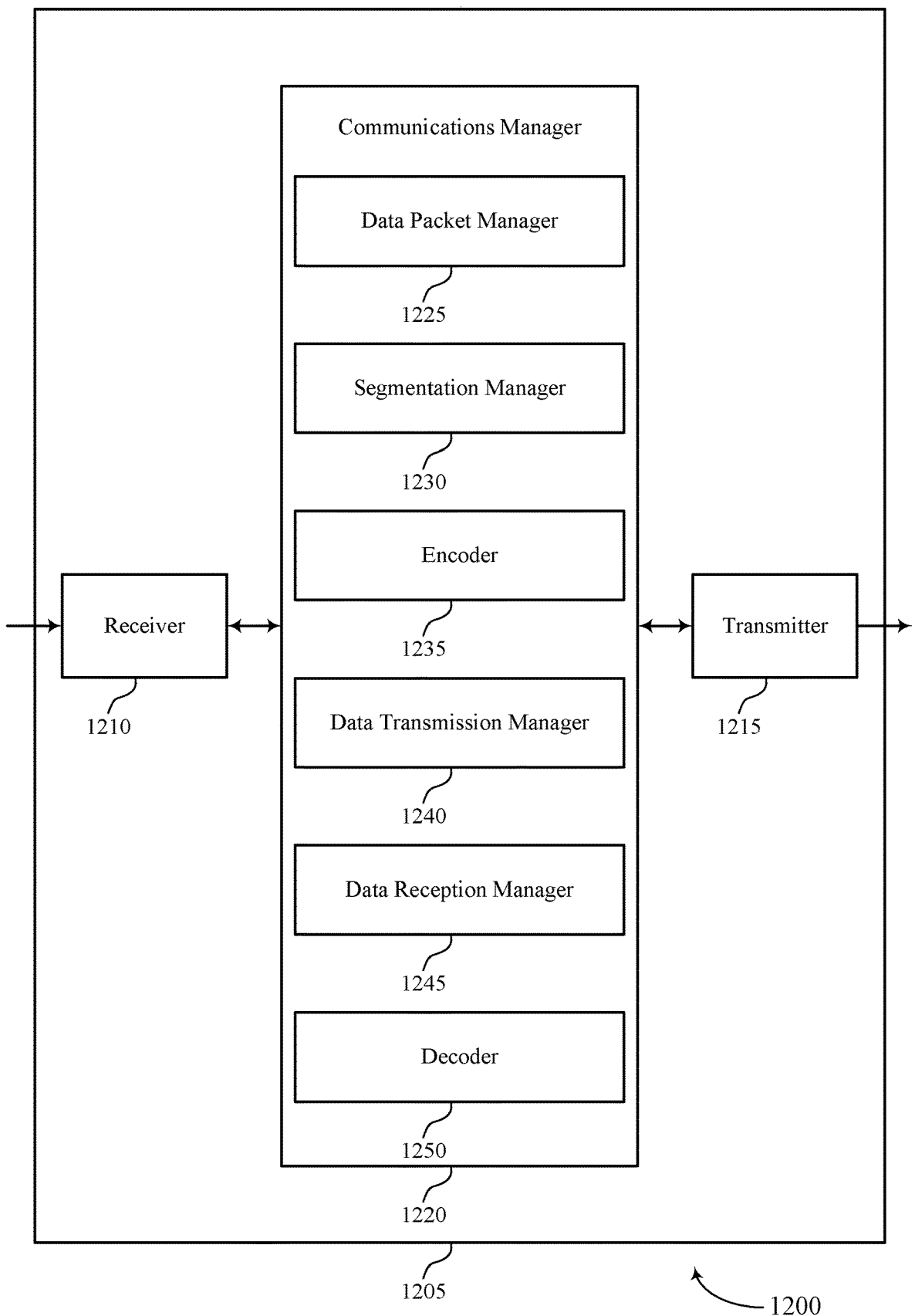

FIG. 12 shows a block diagram 1200 of a device 1205 that supports outer coding techniques in wireless communications in accordance with aspects of the present disclosure. The device 1205 may be an example of aspects of a device 1105, a UE 115, or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to outer coding techniques in wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to outer coding techniques in wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of outer coding techniques in wireless communications as described herein. For example, the communications manager 1220 may include a data packet manager 1225, a segmentation manager 1230, an encoder 1235, a data transmission manager 1240, a data reception manager 1245, a decoder 1250, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first device in accordance with examples as disclosed herein. The data packet manager 1225 may be configured as or otherwise support a means for identifying a set of information packets for transmission to one or more receiving devices, each packet of the set of information packets for transmission in a respective transmission instance. The segmentation manager 1230 may be configured as or otherwise support a means for identifying two or more information subpackets of each packet of the set of information packets. The encoder 1235 may be configured as or otherwise support a means for encoding a set of multiple information subpackets from the two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance. The data transmission manager 1240 may be configured as or otherwise support a means for transmitting, to the one or more receiving devices, the first information packet in the first transmission instance, the second information packet in the second transmission instance, and the first parity subpacket in a third transmission instance.

Additionally or alternatively, the communications manager 1220 may support wireless communication in accordance with examples as disclosed herein. The data reception manager 1245 may be configured as or otherwise support a means for receiving a set of signals in a set of multiple transmission instances, the set of signals including a first set of signals in a first transmission instance, a second set of signals in a second transmission instance, and a third set of signals in a third transmission instance. The decoder 1250 may be configured as or otherwise support a means for decoding a second information packet from the second set of signals in the second transmission instance and a first parity subpacket from the third set of signals in the third transmission instance, where decoding of a first information packet from the first set of signals is unsuccessful. The decoder 1250 may be configured as or otherwise support a means for decoding at least a first information subpacket of the first information packet based on a set of coding parameters, a second information subpacket of the second information packet, and the first parity subpacket. The data packet manager 1225 may be configured as or otherwise support a means for combining, based on decoding the second information packet and the first parity subpacket and at least the first information subpacket, the first information subpacket with one or more other information subpackets of the first information packet to generate the first information packet.

Figure 13:
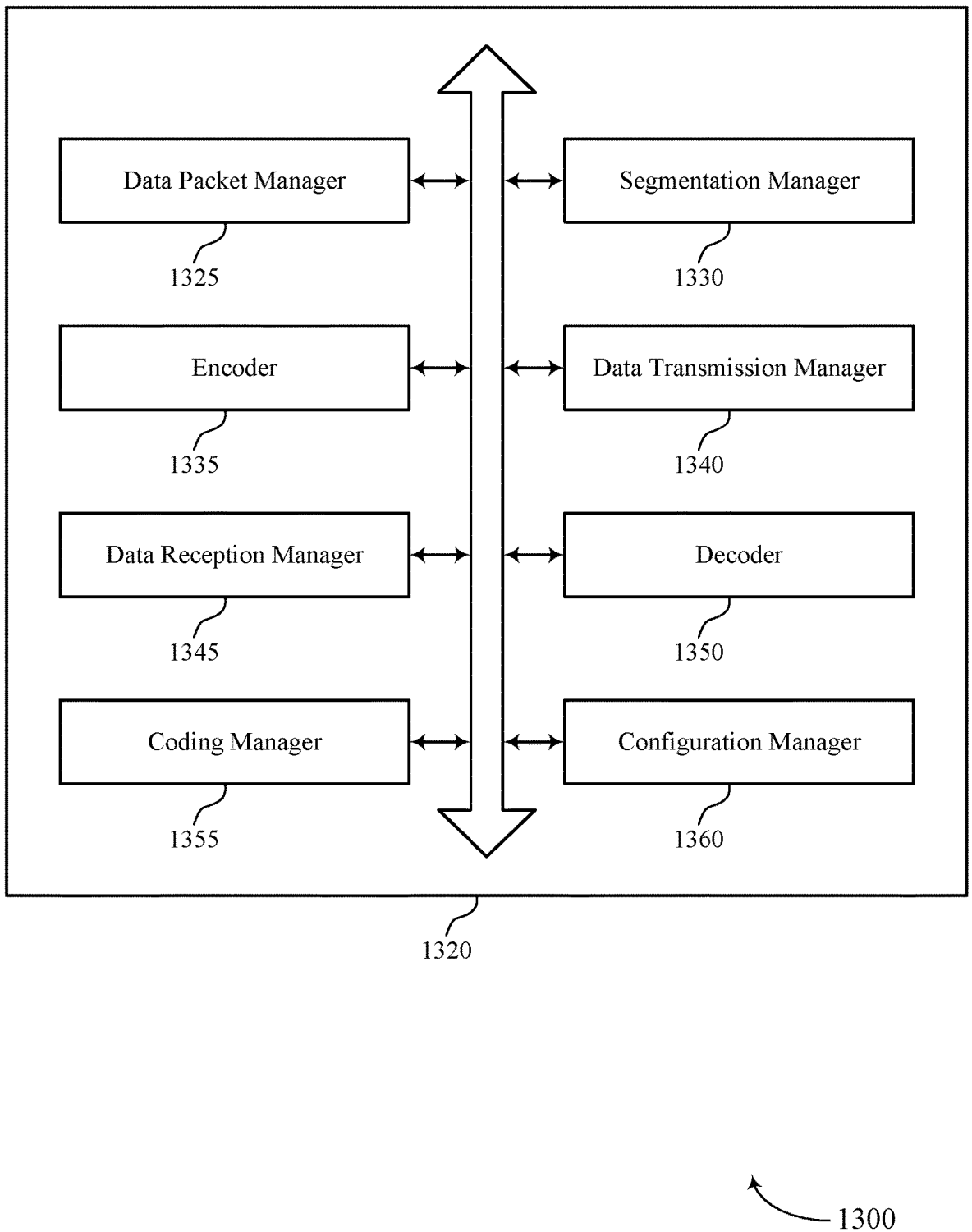
FIG. 13 shows a block diagram of a communications manager that supports outer coding techniques in wireless communications in accordance with aspects of the present disclosure.

FIG. 13 shows a block diagram 1300 of a communications manager 1320 that supports outer coding techniques in wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of outer coding techniques in wireless communications as described herein. For example, the communications manager 1320 may include a data packet manager 1325, a segmentation manager 1330, an encoder 1335, a data transmission manager 1340, a data reception manager 1345, a decoder 1350, a coding manager 1355, a configuration manager 1360, or any combination thereof. Each of these components may communicate, directly or indirectly, with one another (e.g., via one or more buses).

The communications manager 1320 may support wireless communication at a first device in accordance with examples as disclosed herein. The data packet manager 1325 may be configured as or otherwise support a means for identifying a set of information packets for transmission to one or more receiving devices, each packet of the set of information packets for transmission in a respective transmission instance. The segmentation manager 1330 may be configured as or otherwise support a means for identifying two or more information subpackets of each packet of the set of information packets. The encoder 1335 may be configured as or otherwise support a means for encoding a set of multiple information subpackets from the two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance. The data transmission manager 1340 may be configured as or otherwise support a means for transmitting, to the one or more receiving devices, the first information packet in the first transmission instance, the second information packet in the second transmission instance, and the first parity subpacket in a third transmission instance.

In some examples, a second parity subpacket of the set of parity subpackets is based on the first information subpacket and the second information subpacket, and the data transmission manager 1340 may be configured as or otherwise support a means for transmitting, to the one or more receiving devices, the second parity subpacket in a fourth transmission instance.

In some examples, to support the identifying two or more information subpackets, the segmentation manager 1330 may be configured as or otherwise support a means for identifying, for each information packet of the set of information packets, a first determined number of information subpackets, and where the first parity subpacket is encoded using a number of information subpackets that corresponds to the first determined number of information subpackets, and where each information subpacket used to encode the first parity subpacket is from a different information packet. In some examples, to support the identifying two or more information subpackets, the segmentation manager 1330 may segment each packet of the set of information packets into the two or more information subpackets.

In some examples, to support transmitting, the data transmission manager 1340 may be configured as or otherwise support a means for transmitting a second determined number of subpackets in the third transmission instance that include the first determined number of information subpackets of a third information packet and a third determined number of parity subpackets that correspond to a number of parity subpackets in the set of parity subpackets.

In some examples, each parity subpacket of the third determined number of parity subpackets is associated with different information subpackets.

In some examples, to support encoding, the coding manager 1355 may be configured as or otherwise support a means for mapping the set of multiple information subpackets into K rows and X columns of a coding table, where each column of the X columns corresponds to a transmission instance and each row of the K rows corresponds to one information subpacket. In some examples, to support encoding, the coding manager 1355 may be configured as or otherwise support a means for generating the set of parity subpackets based on a determined relationship between respective parity subpackets of the set of parity subpackets and two or more entries of the coding table.

In some examples, the two or more entries of the coding table have a diagonal relationship within the coding table, and where each parity subpacket of the set of parity subpackets are mapped to a parity entry of the coding table that maintains the diagonal relationship with the two or more entries. In some examples, the two or more entries of the coding table include at least two entries for each row of the K rows that are associated with each parity subpacket. In some examples, each packet of the set of information packets is an aggregated packet of two or more data packets that include a data payload.

In some examples, the coding manager 1355 may be configured as or otherwise support a means for writing the set of multiple information subpackets and the set of parity subpackets into a diagonal-in column-out interleaver table, and where the transmitting includes transmitting each column of the diagonal-in column-out interleaver table in a respective transmission instance.

In some examples, the configuration manager 1360 may be configured as or otherwise support a means for transmitting, to the one or more receiving devices, control information that indicates the set of coding parameters. In some examples, the set of coding parameters includes one or more of a number of information subpackets that each information packet is to be segmented into, a total number of subpackets that are transmitted in each transmission instance, or a number of parity subpackets that are transmitted in each transmission instance. In some examples, each of the first information packet, the second information packet, and the first parity subpacket, include an indication of an information payload or a parity payload. In some examples, each of the first information packet, the second information packet, and the first parity subpacket, include an indication of a table index of a coding table, and where the table index of the coding table indicates an information payload or a parity payload.

Additionally or alternatively, the communications manager 1320 may support wireless communication in accordance with examples as disclosed herein. The data reception manager 1345 may be configured as or otherwise support a means for receiving a set of signals in a set of multiple transmission instances, the set of signals including a first set of signals in a first transmission instance, a second set of signals in a second transmission instance, and a third set of signals in a third transmission instance. The decoder 1350 may be configured as or otherwise support a means for decoding a second information packet from the second set of signals in the second transmission instance and a first parity subpacket from the third set of signals in the third transmission instance, where decoding of a first information packet from the first set of signals is unsuccessful. In some examples, the decoder 1350 may be configured as or otherwise support a means for decoding at least a first information subpacket of the first information packet based on a set of coding parameters, a second information subpacket of the second information packet, and the first parity subpacket. In some examples, the data packet manager 1325 may be configured as or otherwise support a means for combining, based on decoding the second information packet and the first parity subpacket and at least the first information subpacket, the first information subpacket with one or more other information subpackets of the first information packet to generate the first information packet.

In some examples, each information packet of each transmission instance is segmented into a first determined number of information subpackets, and the first parity subpacket is encoded using a number of subpackets that corresponds to the first determined number of information subpackets, and where each information subpacket used to encode the first parity subpacket is from a different information packet. In some examples, a second determined number of subpackets in the third transmission instance include the first determined number of information subpackets of a third information packet and one or more parity subpackets. In some examples, each parity subpacket of the one or more parity subpackets is associated with different information subpackets.

In some examples, to support decoding at least the first information subpacket, the coding manager 1355 may be configured as or otherwise support a means for determining the first information subpacket based on successfully decoded subpackets from a diagonal mapping of information subpackets and parity subpackets in a coding table. In some examples, each of the first information packet and second information packet is an aggregated packet of two or more data packets that include a data payload.

In some examples, the configuration manager 1360 may be configured as or otherwise support a means for receiving control information that indicates the set of coding parameters. In some examples, the set of coding parameters includes one or more of a number of information subpackets that each information packet is segmented into, a total number of subpackets that are transmitted in each transmission instance, or a number of parity subpackets that are transmitted in each transmission instance. In some examples, each of the first information packet, the second information packet, and the first parity subpacket, include an indication of an information payload or a parity payload. In some examples, each of the first information packet, the second information packet, and the first parity subpacket, include an indication of a table index of a coding table, and where the table index of the coding table indicates an information payload or a parity payload.

Figure 14:
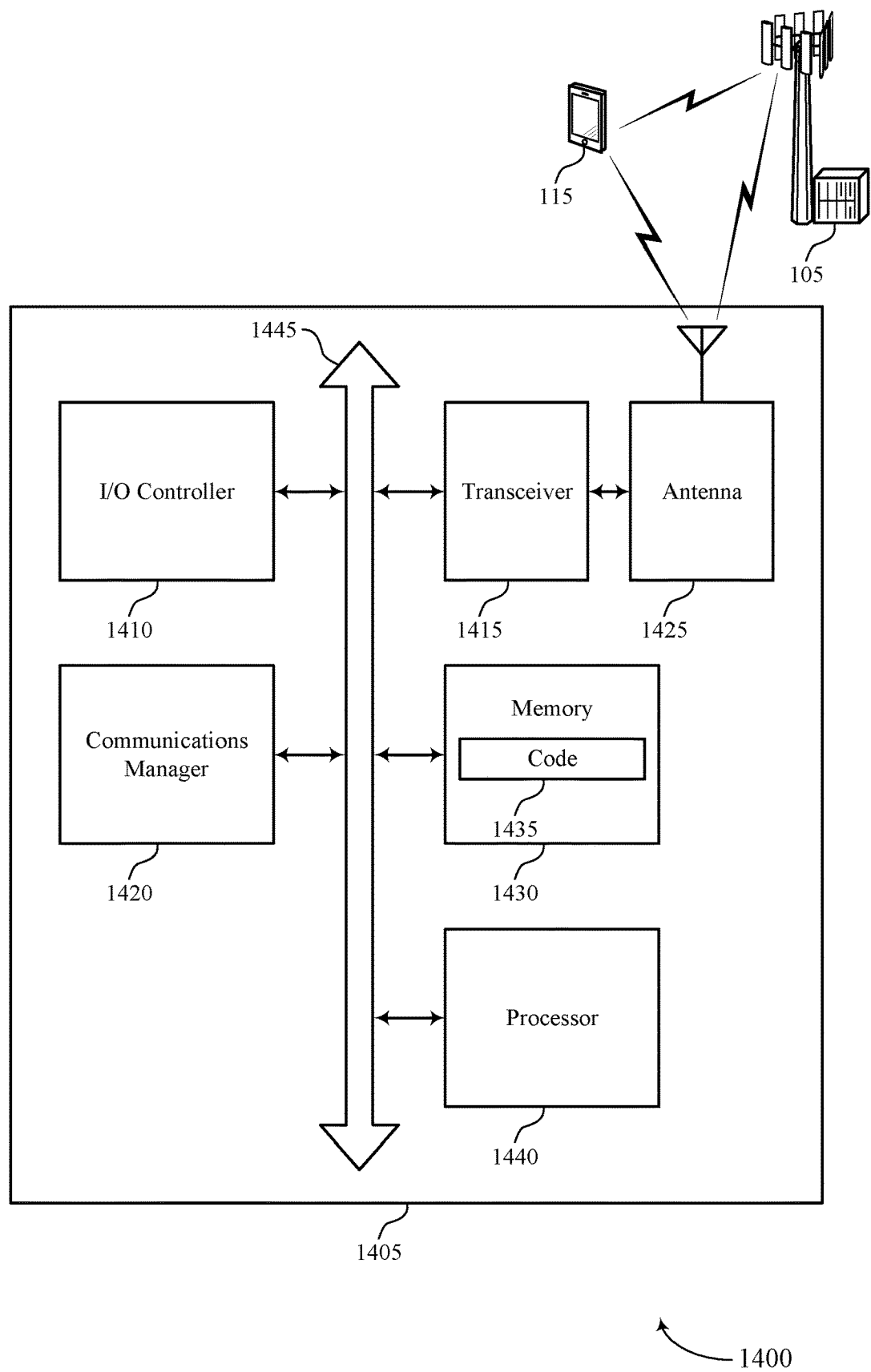
FIG. 14 shows a diagram of a system including a UE that supports outer coding techniques in wireless communications in accordance with aspects of the present disclosure.

FIG. 14 shows a diagram of a system 1400 including a device 1405 that supports outer coding techniques in wireless communications in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting outer coding techniques in wireless communications). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a first device in accordance with examples as disclosed herein. For example, the communications manager 1420 may be configured as or otherwise support a means for identifying a set of information packets for transmission to one or more receiving devices, each packet of the set of information packets for transmission in a respective transmission instance. The communications manager 1420 may be configured as or otherwise support a means for identifying two or more information subpackets of each packet of the set of information packets. The communications manager 1420 may be configured as or otherwise support a means for encoding a set of multiple information subpackets from the two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance. The communications manager 1420 may be configured as or otherwise support a means for transmitting, to the one or more receiving devices, the first information packet in the first transmission instance, the second information packet in the second transmission instance, and the first parity subpacket in a third transmission instance.

Additionally or alternatively, the communications manager 1420 may support wireless communication in accordance with examples as disclosed herein. For example, the communications manager 1420 may be configured as or otherwise support a means for receiving a set of signals in a set of multiple transmission instances, the set of signals including a first set of signals in a first transmission instance, a second set of signals in a second transmission instance, and a third set of signals in a third transmission instance. The communications manager 1420 may be configured as or otherwise support a means for decoding a second information packet from the second set of signals in the second transmission instance and a first parity subpacket from the third set of signals in the third transmission instance, where decoding of a first information packet from the first set of signals is unsuccessful. The communications manager 1420 may be configured as or otherwise support a means for decoding at least a first information subpacket of the first information packet based on a set of coding parameters, a second information subpacket of the second information packet, and the first parity subpacket. The communications manager 1420 may be configured as or otherwise support a means for combining, based on decoding the second information packet and the first parity subpacket and at least the first information subpacket, the first information subpacket with one or more other information subpackets of the first information packet to generate the first information packet.

By including or configuring the communications manager 1420 in accordance with examples as described herein, the device 1405 may support techniques for outer coding of data blocks to generate parity blocks where each physical layer transmission may include both data and parity, and a receiving device may use one or more parity blocks to recover the one or more missing data blocks. Thus one or more retransmissions of data blocks may be avoided, which may enhance network efficiency, reduce latency, and improve system reliability. Further, techniques discussed herein may allow for a reduced memory size at a receiving device (e.g., a reduced amount of memory in a wireless modem of a UE) which may reduce an overall cost of the device.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of outer coding techniques in wireless communications as described herein, or the processor 1440 and the memory 1430 may be otherwise configured to perform or support such operations.

Figure 15:
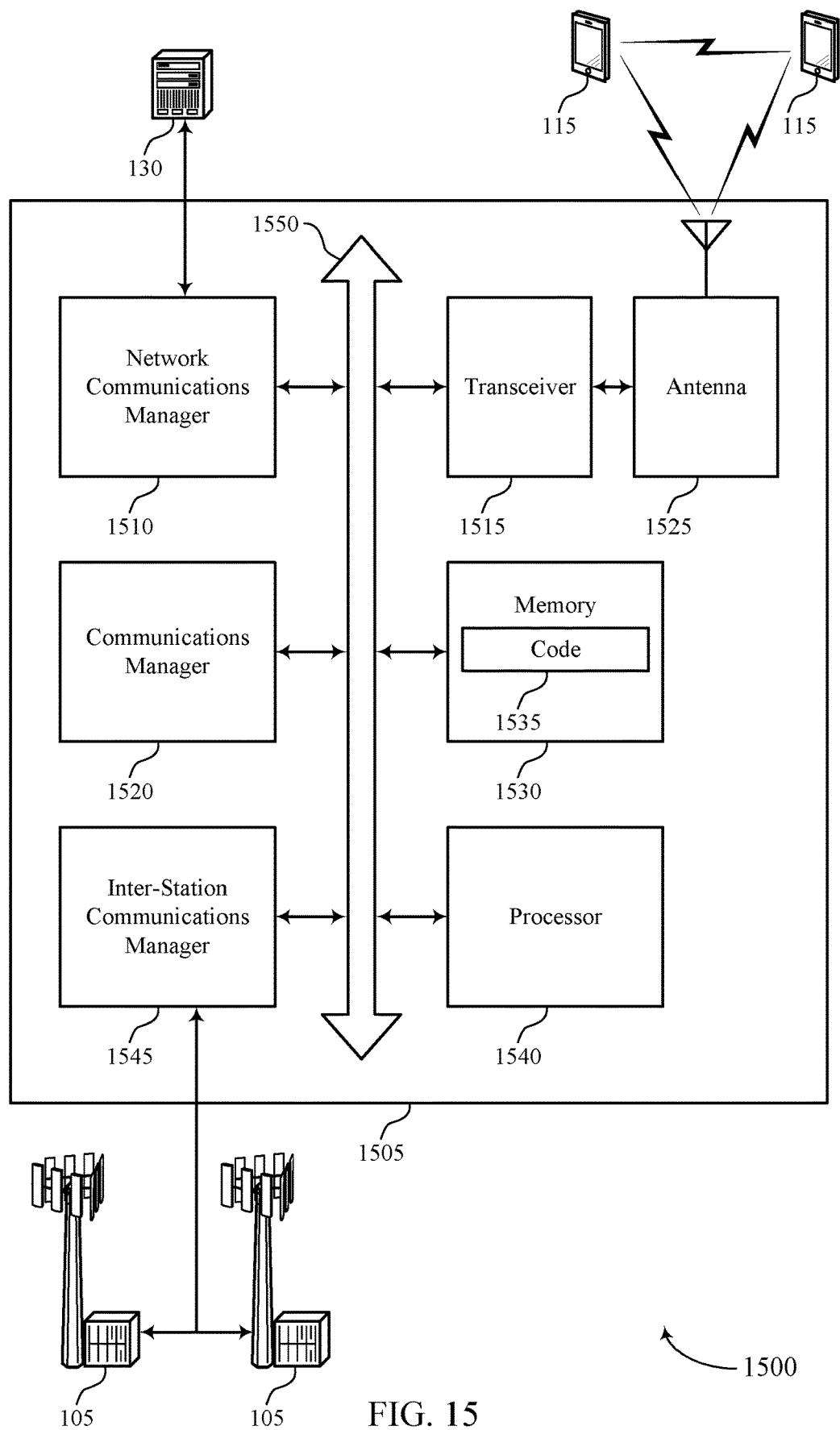
FIG. 15 shows a diagram of a system including a base station that supports outer coding techniques in wireless communications in accordance with aspects of the present disclosure.

FIG. 15 shows a diagram of a system 1500 including a device 1505 that supports outer coding techniques in wireless communications in accordance with aspects of the present disclosure. The device 1505 may be an example of or include the components of a device 1105, a device 1205, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1115, a transmitter 1215, a receiver 1110, a receiver 1210, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting outer coding techniques in wireless communications). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a first device in accordance with examples as disclosed herein. For example, the communications manager 1520 may be configured as or otherwise support a means for identifying a set of information packets for transmission to one or more receiving devices, each packet of the set of information packets for transmission in a respective transmission instance. The communications manager 1520 may be configured as or otherwise support a means for identifying two or more information subpackets of each packet of the set of information packets. The communications manager 1520 may be configured as or otherwise support a means for encoding a set of multiple information subpackets from the two or more different information packets according to a set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance. The communications manager 1520 may be configured as or otherwise support a means for transmitting, to the one or more receiving devices, the first information packet in the first transmission instance, the second information packet in the second transmission instance, and the first parity subpacket in a third transmission instance.

Additionally or alternatively, the communications manager 1520 may support wireless communication in accordance with examples as disclosed herein. For example, the communications manager 1520 may be configured as or otherwise support a means for receiving a set of signals in a set of multiple transmission instances, the set of signals including a first set of signals in a first transmission instance, a second set of signals in a second transmission instance, and a third set of signals in a third transmission instance. The communications manager 1520 may be configured as or otherwise support a means for decoding a second information packet from the second set of signals in the second transmission instance and a first parity subpacket from the third set of signals in the third transmission instance, where decoding of a first information packet from the first set of signals is unsuccessful. The communications manager 1520 may be configured as or otherwise support a means for decoding at least a first information subpacket of the first information packet based on a set of coding parameters, a second information subpacket of the second information packet, and the first parity subpacket. The communications manager 1520 may be configured as or otherwise support a means for combining, based on decoding the second information packet and the first parity subpacket and at least the first information subpacket, the first information subpacket with one or more other information subpackets of the first information packet to generate the first information packet.

By including or configuring the communications manager 1520 in accordance with examples as described herein, the device 1505 may support techniques for outer coding of data blocks to generate parity blocks where each physical layer transmission may include both data and parity, and a receiving device may use one or more parity blocks to recover the one or more missing data blocks. Thus one or more retransmissions of data blocks may be avoided, which may enhance network efficiency, reduce latency, and improve system reliability. Further, techniques discussed herein may allow for a reduced memory size at a receiving device (e.g., a reduced amount of memory in a wireless modem of a UE) which may reduce an overall cost of the device.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of outer coding techniques in wireless communications as described herein, or the processor 1540 and the memory 1530 may be otherwise configured to perform or support such operations.

Figure 16:
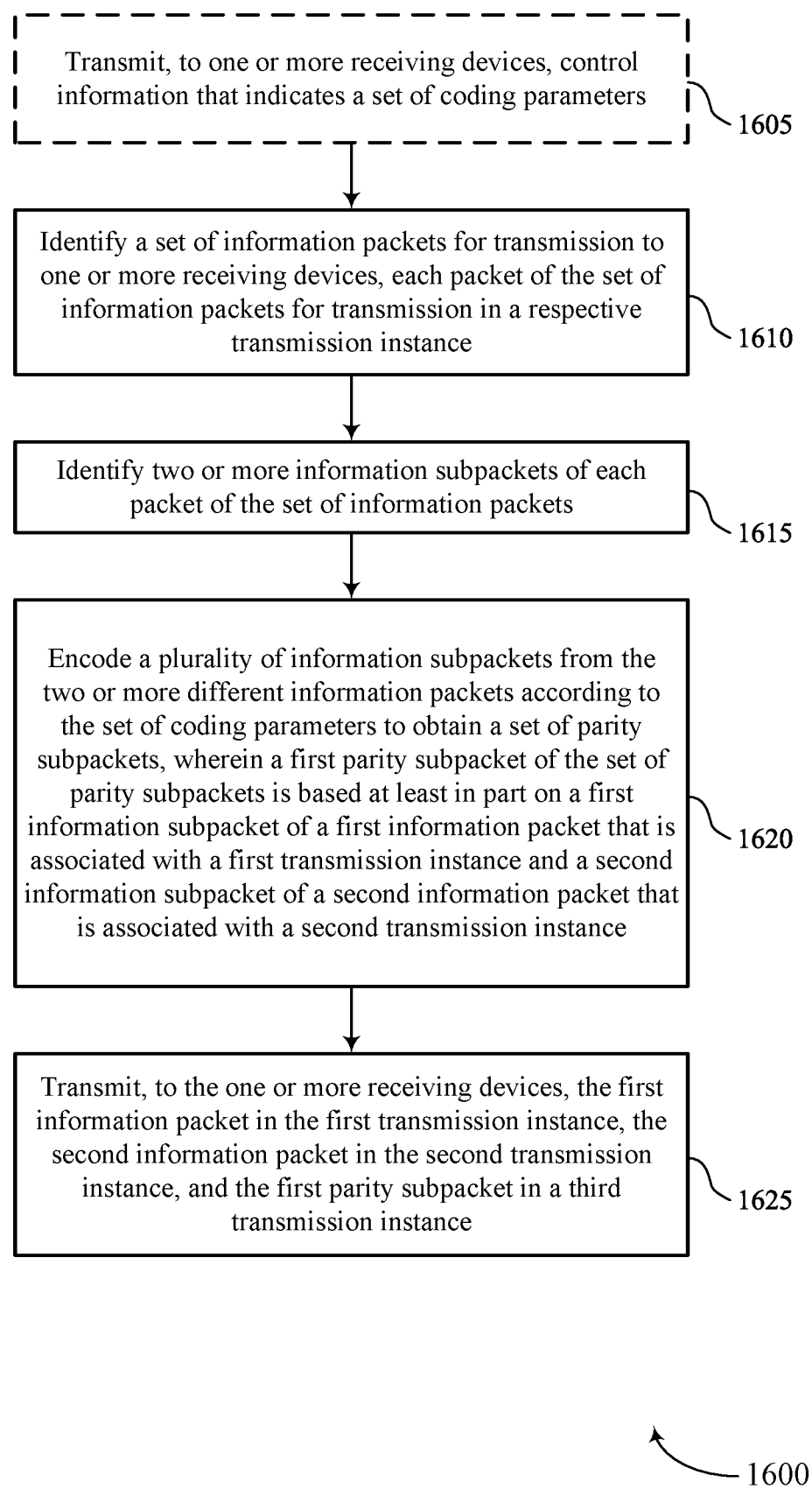
FIGS. 16 through 22 show flowcharts illustrating methods that support outer coding techniques in wireless communications in accordance with aspects of the present disclosure.

FIG. 16 shows a flowchart illustrating a method 1600 that supports outer coding techniques in wireless communications in accordance with aspects of the present disclosure. The operations of the method 1600 may be implemented by a UE or a base station or its components as described herein. For example, the operations of the method 1600 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

Optionally, at 1605, the method may include transmitting, to one or more receiving devices, control information that indicates a set of coding parameters. The operations of 1605 may be performed in accordance with examples as disclosed herein. In some examples, aspects of the operations of 1605 may be performed by a configuration manager 1360 as described with reference to FIG. 13.

At 1610, the method may include identifying a set of information packets for transmission to one or more receiving devices, each packet of the set of information packets for transmission in a respective transmission instance. The operations of 1610 may be performed in accordance with examples as disclosed herein. In some examples, aspects of the operations of 1610 may be performed by a data packet manager 1325 as described with reference to FIG. 13.

At 1615, the method may include identifying two or more information subpackets of each packet of the set of information packets. The operations of 1615 may be performed in accordance with examples as disclosed herein. In some examples, aspects of the operations of 1615 may be performed by a segmentation manager 1330 as described with reference to FIG. 13.

At 1620, the method may include encoding a set of multiple information subpackets from the two or more different information packets according to the set of coding parameters to obtain a set of parity subpackets, where a first parity subpacket of the set of parity subpackets is based on a first information subpacket of a first information packet that is associated with a first transmission instance and a second information subpacket of a second information packet that is associated with a second transmission instance. The operations of 1620 may be performed in accordance with examples as disclosed herein. In some examples, aspects of the operations of 1620 may be performed by an encoder 1335 as described with reference to FIG. 13.

At 1625, the method may include transmitting, to the one or more receiving devices, the first information packet in the first transmission instance, the second information packet in the second transmission instance, and the first parity subpacket in a third transmission instance. The operations of 1625 may be performed in accordance with examples as disclosed herein. In some examples, aspects of the operations of 1625 may be performed by a data transmission manager 1340 as described with reference to FIG. 13.

Figure 17:
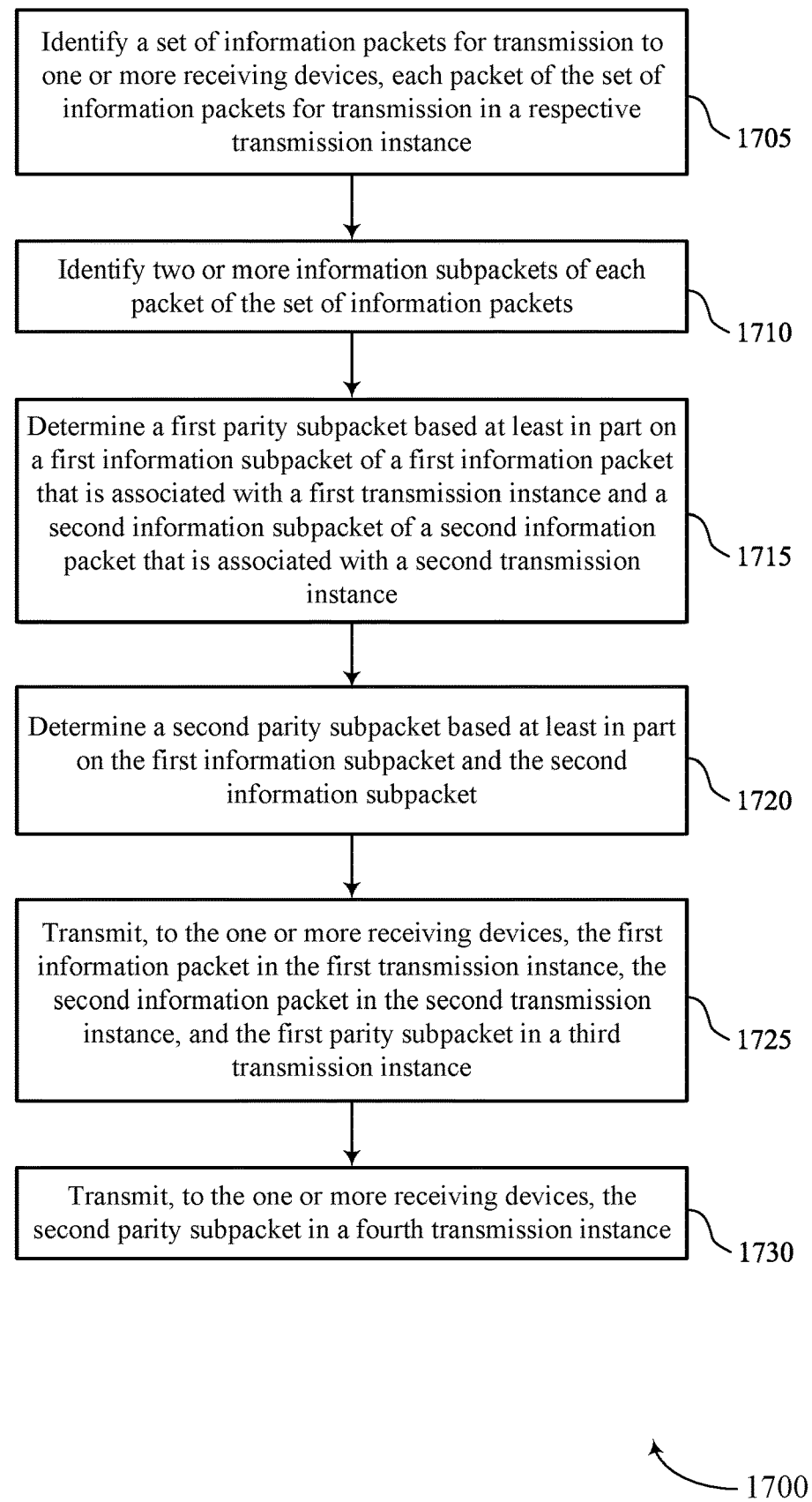

FIG. 17 shows a flowchart illustrating a method 1700 that supports outer coding techniques in wireless communications in accordance with aspects of the present disclosure. The operations of the method 1700 may be implemented by a UE or a base station or its components as described herein. For example, the operations of the method 1700 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include identifying a set of information packets for transmission to one or more receiving devices, each packet of the set of information packets for transmission in a respective transmission instance. The operations of 1705 may be performed in accordance with examples as disclosed herein. In some examples, aspects of the operations of 1705 may be performed by a data packet manager 1325 as described with reference to FIG. 13.

At 1710, the method may include identifying two or more information subpackets of each packet of the set of information packets. The operations of 1710 may be performed in accordance with examples as disclosed herein. In some examples, aspects of the operations of 1710 may be performed by a segmentation manager 1330 as described with reference to FIG. 13.

At 1715, the method may include determining a first parity subpacket based at least in part on a first information subpacket of a first information packet that is associated with a first transmission instance and a second information subpacket of a second information packet that is associated with a second transmission instance. The operations of 1715 may be performed in accordance with examples as disclosed herein. In some examples, aspects of the operations of 1715 may be performed by an encoder 1335 as described with reference to FIG. 13.

At 1720, the method may include determining a second parity subpacket based at least in part on the first information subpacket and the second information subpacket. The operations of 1720 may be performed in accordance with examples as disclosed herein. In some examples, aspects of the operations of 1720 may be performed by an encoder 1335 as described with reference to FIG. 13.

At 1725, the method may include transmitting, to the one or more receiving devices, the first information packet in the first transmission instance, the second information packet in the second transmission instance, and the first parity subpacket in a third transmission instance. The operations of 1725 may be performed in accordance with examples as disclosed herein. In some examples, aspects of the operations of 1725 may be performed by a data transmission manager 1340 as described with reference to FIG. 13.

At 1730, the method may include transmitting, to the one or more receiving devices, the second parity subpacket in a fourth transmission instance. The operations of 1730 may be performed in accordance with examples as disclosed herein. In some examples, aspects of the operations of 1730 may be performed by a data transmission manager 1340 as described with reference to FIG. 13.

Figure 18:
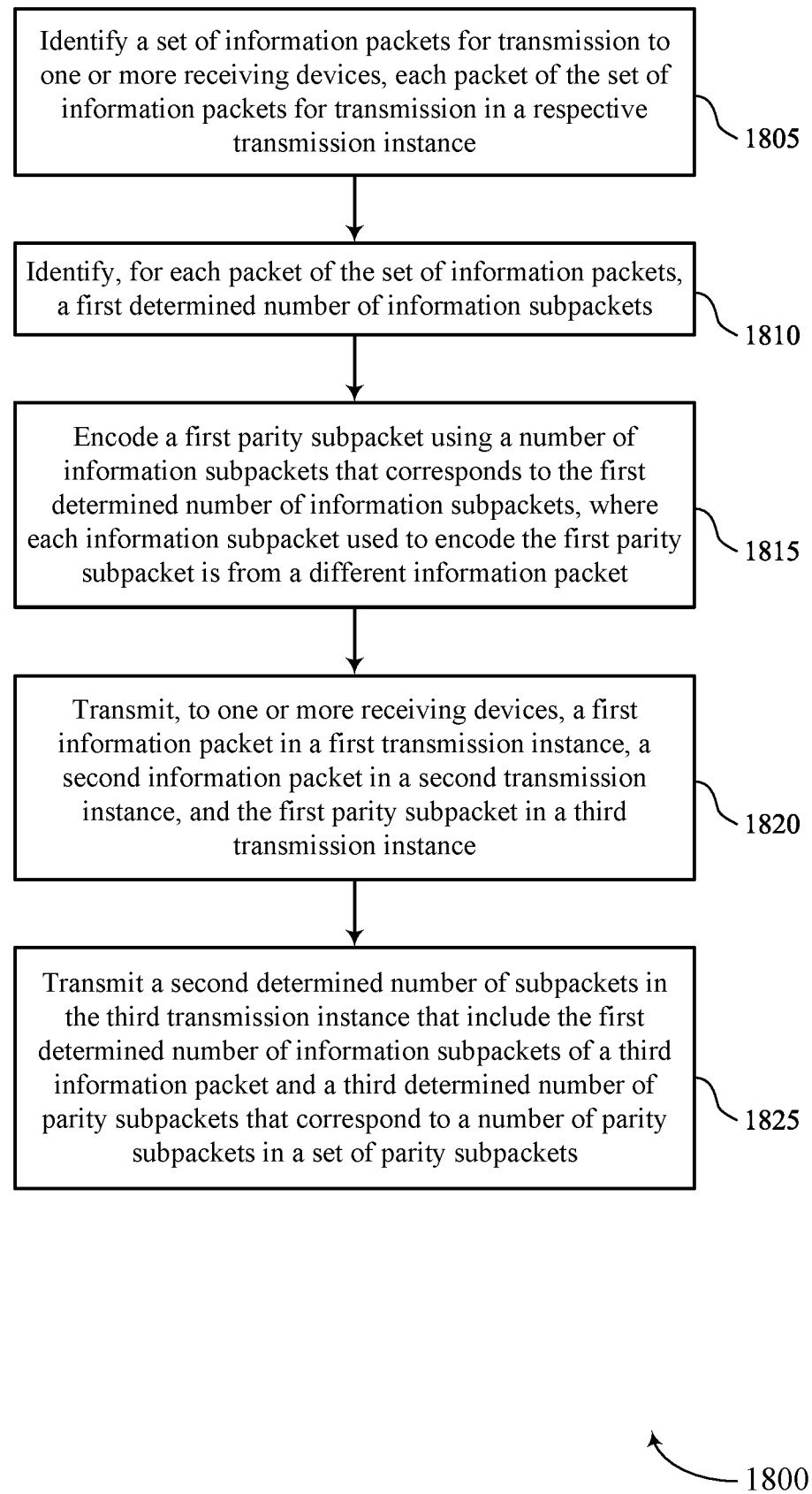

FIG. 18 shows a flowchart illustrating a method 1800 that supports outer coding techniques in wireless communications in accordance with aspects of the present disclosure. The operations of the method 1800 may be implemented by a UE or a base station or its components as described herein. For example, the operations of the method 1800 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include identifying a set of information packets for transmission to one or more receiving devices, each packet of the set of information packets for transmission in a respective transmission instance. The operations of 1805 may be performed in accordance with examples as disclosed herein. In some examples, aspects of the operations of 1805 may be performed by a data packet manager 1325 as described with reference to FIG. 13.

At 1810, the method may include identifying, for each packet of the set of information packets, two or more information subpackets. The operations of 1810 may be performed in accordance with examples as disclosed herein. In some examples, aspects of the operations of 1810 may be performed by a segmentation manager 1330 as described with reference to FIG. 13.

At 1815, the method may include encoding a first parity subpacket using a number of information subpackets that corresponds to the first determined number of information subpackets, where each information subpacket used to encode the first parity subpacket is from a different information packet. The operations of 1815 may be performed in accordance with examples as disclosed herein. In some examples, aspects of the operations of 1815 may be performed by an encoder 1335 as described with reference to FIG. 13.

At 1820, the method may include transmitting, to one or more receiving devices, a first information packet in a first transmission instance, a second information packet in a second transmission instance, and the first parity subpacket in a third transmission instance. The operations of 1820 may be performed in accordance with examples as disclosed herein. In some examples, aspects of the operations of 1820 may be performed by a data transmission manager 1340 as described with reference to FIG. 13.

At 1825, the method may include transmitting a second determined number of subpackets in the third transmission instance that include the first determined number of information subpackets of a third information packet and a third determined number of parity subpackets that correspond to a number of parity subpackets in a set of parity subpackets. The operations of 1825 may be performed in accordance with examples as disclosed herein. In some examples, aspects of the operations of 1825 may be performed by a data transmission manager 1340 as described with reference to FIG. 13.

Figure 19:
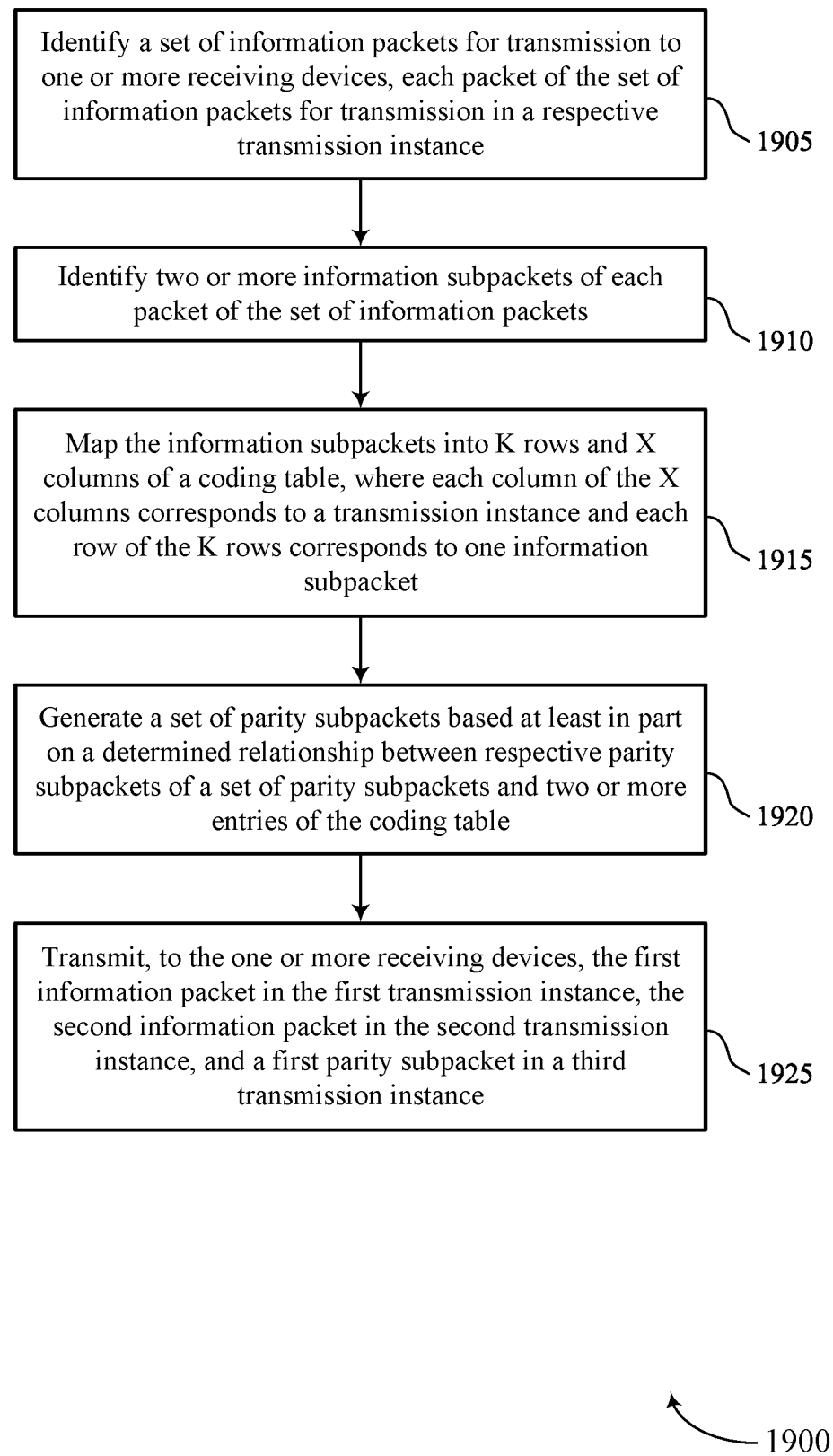

FIG. 19 shows a flowchart illustrating a method 1900 that supports outer coding techniques in wireless communications in accordance with aspects of the present disclosure. The operations of the method 1900 may be implemented by a UE or a base station or its components as described herein. For example, the operations of the method 1900 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 1905, the method may include identifying a set of information packets for transmission to one or more receiving devices, each packet of the set of information packets for transmission in a respective transmission instance. The operations of 1905 may be performed in accordance with examples as disclosed herein. In some examples, aspects of the operations of 1905 may be performed by a data packet manager 1325 as described with reference to FIG. 13.

At 1910, the method may include identifying two or more information subpackets of each packet of the set of information packets. The operations of 1910 may be performed in accordance with examples as disclosed herein. In some examples, aspects of the operations of 1910 may be performed by a segmentation manager 1330 as described with reference to FIG. 13.

At 1915, the method may include mapping the information subpackets into K rows and X columns of a coding table, where each column of the X columns corresponds to a transmission instance and each row of the K rows corresponds to one information subpacket. The operations of 1915 may be performed in accordance with examples as disclosed herein. In some examples, aspects of the operations of 1915 may be performed by a coding manager 1355 as described with reference to FIG. 13.

At 1920, the method may include generating a set of parity subpackets based on a determined relationship between respective parity subpackets of a set of parity subpackets and two or more entries of the coding table. The operations of 1920 may be performed in accordance with examples as disclosed herein. In some examples, aspects of the operations of 1920 may be performed by a coding manager 1355 as described with reference to FIG. 13. In some cases, a first parity subpacket of the set of parity subpackets is based on a first information subpacket of a first information packet that is associated with a first transmission instance and a second information subpacket of a second information packet that is associated with a second transmission instance.

At 1925, the method may include transmitting, to the one or more receiving devices, the first information packet in the first transmission instance, the second information packet in the second transmission instance, and a first parity subpacket in a third transmission instance. The operations of 1925 may be performed in accordance with examples as disclosed herein. In some examples, aspects of the operations of 1925 may be performed by a data transmission manager 1340 as described with reference to FIG. 13.

Figure 20:
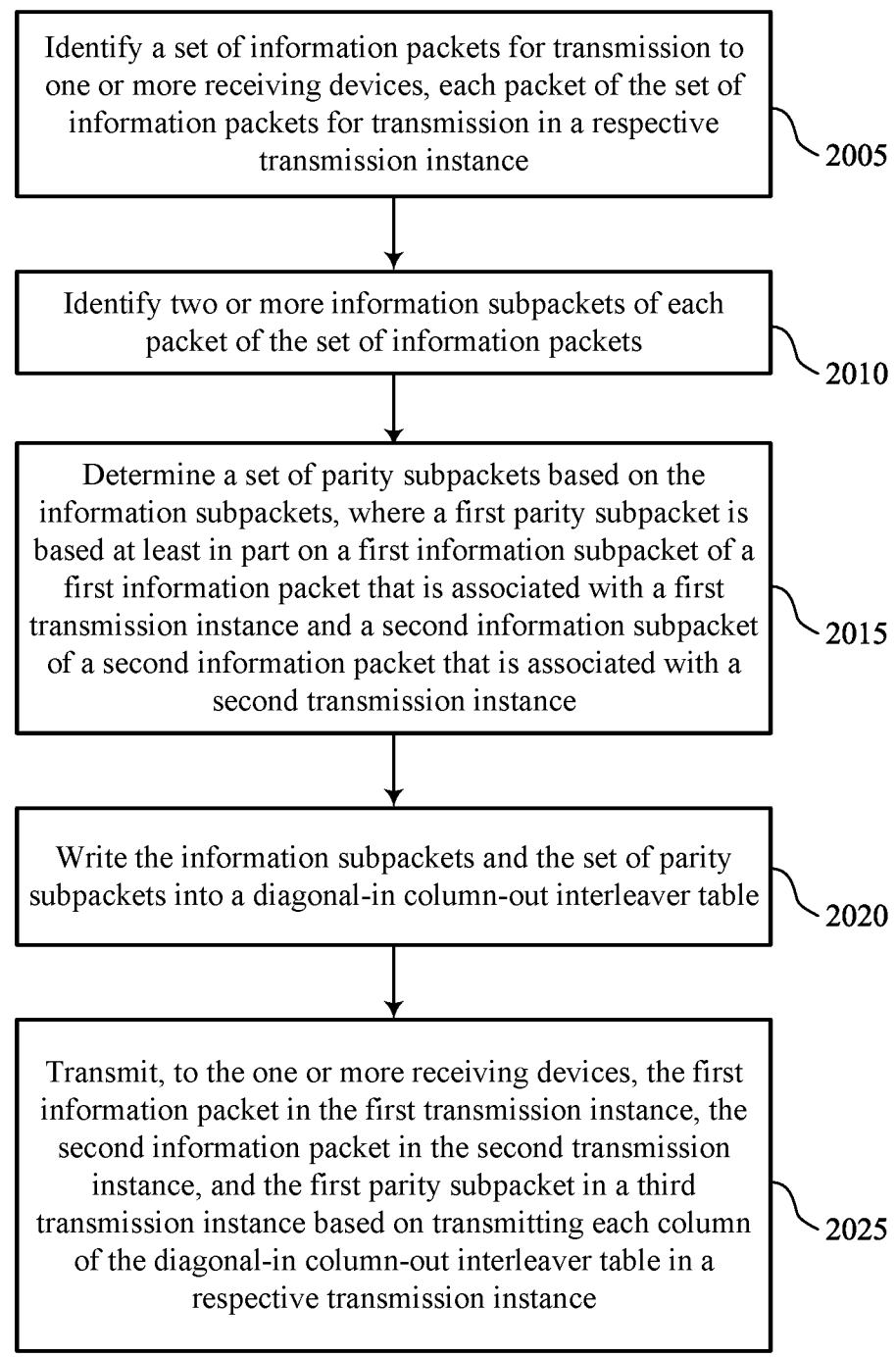

FIG. 20 shows a flowchart illustrating a method 2000 that supports outer coding techniques in wireless communications in accordance with aspects of the present disclosure. The operations of the method 2000 may be implemented by a UE or a base station or its components as described herein. For example, the operations of the method 2000 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 2005, the method may include identifying a set of information packets for transmission to one or more receiving devices, each packet of the set of information packets for transmission in a respective transmission instance. The operations of 2005 may be performed in accordance with examples as disclosed herein. In some examples, aspects of the operations of 2005 may be performed by a data packet manager 1325 as described with reference to FIG. 13.

At 2010, the method may include identifying two or more information subpackets of each packet of the set of information packets. The operations of 2010 may be performed in accordance with examples as disclosed herein. In some examples, aspects of the operations of 2010 may be performed by a segmentation manager 1330 as described with reference to FIG. 13.

At 2015, the method may include writing the set of multiple information subpackets and the set of parity subpackets into a diagonal-in column-out interleaver table, and where the transmitting includes transmitting each column of the diagonal-in column-out interleaver table in a respective transmission instance. The operations of 2015 may be performed in accordance with examples as disclosed herein. In some examples, aspects of the operations of 2015 may be performed by a coding manager 1355 as described with reference to FIG. 13.

At 2020, the method may include writing the information subpackets and the set of parity subpackets into a diagonal-in column-out interleaver table. The operations of 2020 may be performed in accordance with examples as disclosed herein. In some examples, aspects of the operations of 2020 may be performed by an encoder 1335 as described with reference to FIG. 13.

At 2025, the method may include transmitting, to the one or more receiving devices, the first information packet in the first transmission instance, the second information packet in the second transmission instance, and the first parity subpacket in a third transmission instance based on transmitting each column of the diagonal-in column-out interleaver table in a respective transmission instance. The operations of 2025 may be performed in accordance with examples as disclosed herein. In some examples, aspects of the operations of 2025 may be performed by a data transmission manager 1340 as described with reference to FIG. 13.

Figure 21:
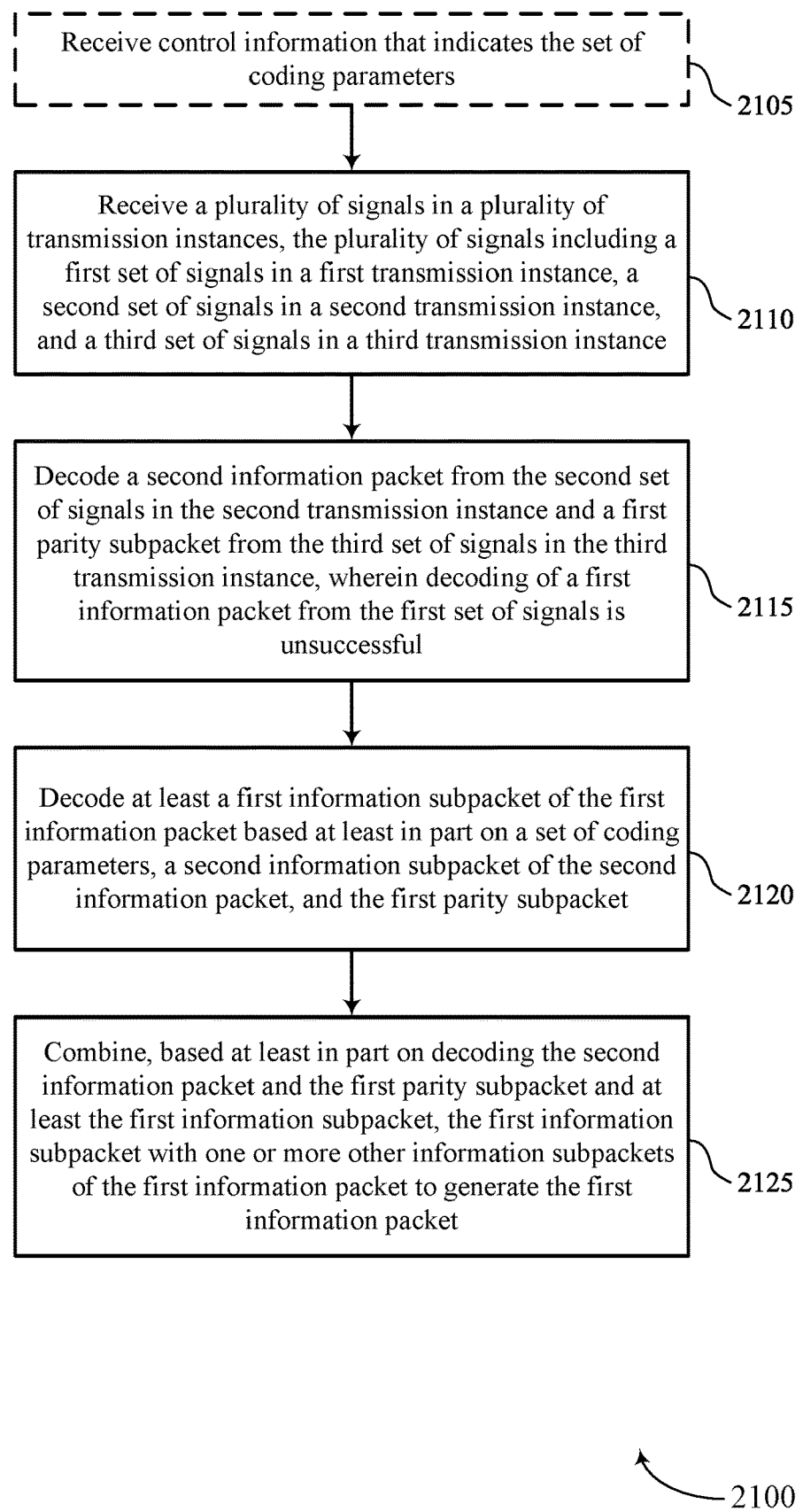

FIG. 21 shows a flowchart illustrating a method 2100 that supports outer coding techniques in wireless communications in accordance with aspects of the present disclosure. The operations of the method 2100 may be implemented by a UE or a base station or its components as described herein. For example, the operations of the method 2100 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

Optionally, at 2105, the method may include receiving control information that indicates the set of coding parameters. The operations of 2105 may be performed in accordance with examples as disclosed herein. In some examples, aspects of the operations of 2105 may be performed by a configuration manager 1360 as described with reference to FIG. 13.

At 2110, the method may include receiving a plurality of signals in a plurality of multiple transmission instances, the plurality of signals including a first set of signals in a first transmission instance, a second set of signals in a second transmission instance, and a third set of signals in a third transmission instance. The operations of 2110 may be performed in accordance with examples as disclosed herein. In some examples, aspects of the operations of 2110 may be performed by a data reception manager 1345 as described with reference to FIG. 13.

At 2115, the method may include decoding a second information packet from the second set of signals in the second transmission instance and a first parity subpacket from the third set of signals in the third transmission instance, where decoding of a first information packet from the first set of signals is unsuccessful. The operations of 2115 may be performed in accordance with examples as disclosed herein. In some examples, aspects of the operations of 2115 may be performed by a decoder 1350 as described with reference to FIG. 13.

At 2120, the method may include decoding at least a first information subpacket of the first information packet based on the set of coding parameters, a second information subpacket of the second information packet, and the first parity subpacket. The operations of 2120 may be performed in accordance with examples as disclosed herein. In some examples, aspects of the operations of 2120 may be performed by a decoder 1350 as described with reference to FIG. 13.

At 2125, the method may include combining, based on decoding the second information packet and the first parity subpacket and at least the first information subpacket, the first information subpacket with one or more other information subpackets of the first information packet to generate the first information packet. The operations of 2125 may be performed in accordance with examples as disclosed herein. In some examples, aspects of the operations of 2125 may be performed by a data packet manager 1325 as described with reference to FIG. 13.

Figure 22:
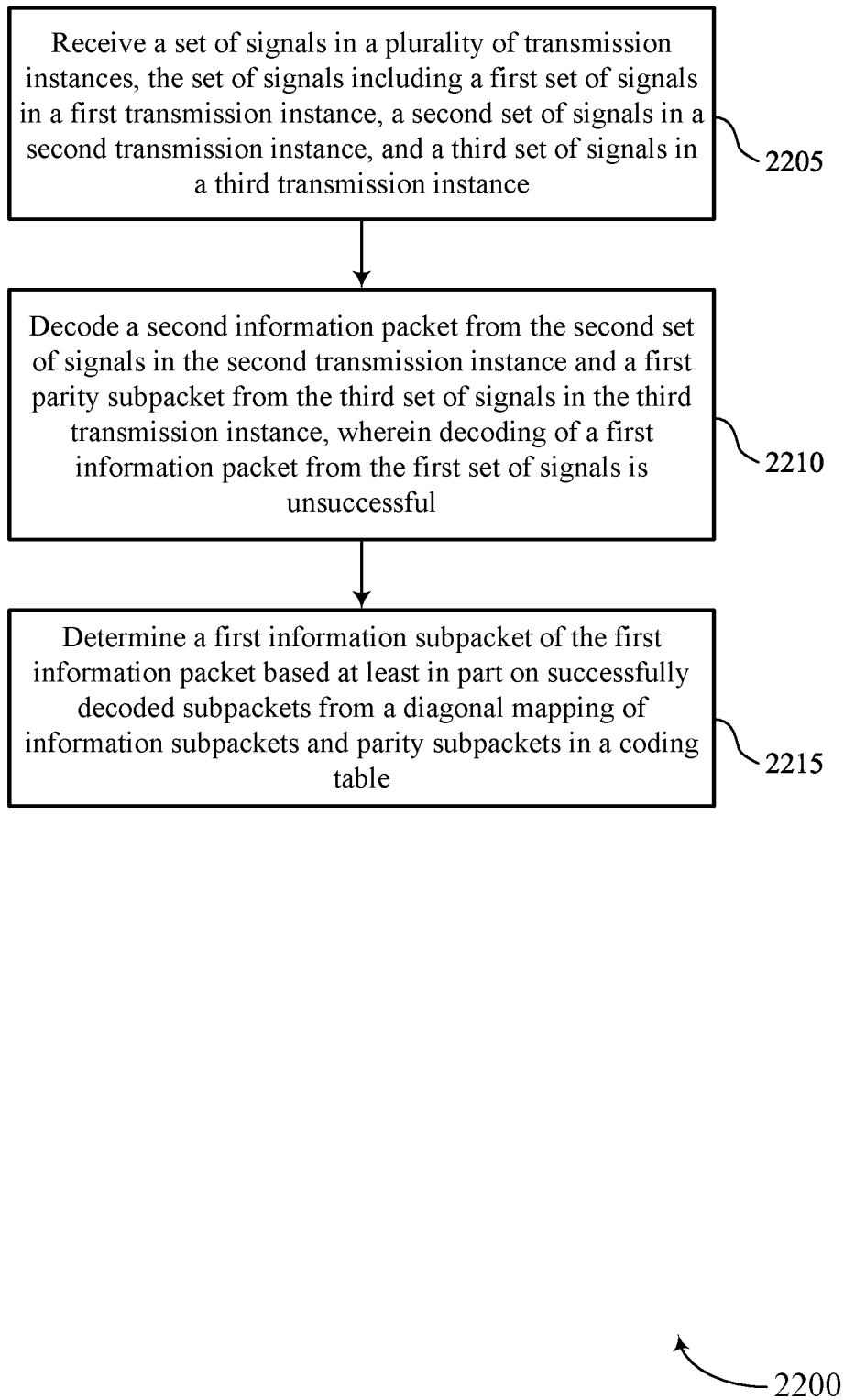

FIG. 22 shows a flowchart illustrating a method 2200 that supports outer coding techniques in wireless communications in accordance with aspects of the present disclosure.

The operations of the method 2200 may be implemented by a UE or a base station or its components as described herein. For example, the operations of the method 2200 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 2205, the method may include receiving a plurality of signals in a plurality of transmission instances, the plurality of signals including a first set of signals in a first transmission instance, a second set of signals in a second transmission instance, and a third set of signals in a third transmission instance. The operations of 2205 may be performed in accordance with examples as disclosed herein. In some examples, aspects of the operations of 2205 may be performed by a data reception manager 1345 as described with reference to FIG. 13.

At 2210, the method may include decoding a second information packet from the second set of signals in the second transmission instance and a first parity subpacket from the third set of signals in the third transmission instance, where decoding of a first information packet from the first set of signals is unsuccessful. The operations of 2210 may be performed in accordance with examples as disclosed herein. In some examples, aspects of the operations of 2210 may be performed by a decoder 1350 as described with reference to FIG. 13.

At 2215, the method may include determining a first information subpacket of the first information packet based at least in part on successfully decoded subpackets from a diagonal mapping of information subpackets and parity subpackets in a coding table. The operations of 2215 may be performed in accordance with examples as disclosed herein. In some examples, aspects of the operations of 2215 may be performed by a coding manager 1355 as described with reference to FIG. 13.

The following provides an overview of aspects of the present disclosure:

Aspect 1: A method for wireless communication at a first device, comprising: identifying a set of information packets for transmission to one or more receiving devices, each packet of the set of information packets for transmission in a respective transmission instance; identifying two or more information subpackets of each packet of the set of information packets; encoding a plurality of information subpackets from two or more different information packets according to a set of coding parameters to obtain a set of parity subpackets, wherein a first parity subpacket of the set of parity subpackets is based at least in part on a first information subpacket of a first information packet that is associated with a first transmission instance and a second information subpacket of a second information packet that is associated with a second transmission instance; and transmitting, to the one or more receiving devices, the first information packet in the first transmission instance, the second information packet in the second transmission instance, and the first parity subpacket in a third transmission instance.

Aspect 2: The method of aspect 1, wherein a second parity subpacket of the set of parity subpackets is based at least in part on the first information subpacket and the second information subpacket, and wherein the method further comprises: transmitting, to the one or more receiving devices, the second parity subpacket in a fourth transmission instance.

Aspect 3: The method of any of aspects 1 through 2, wherein the identifying the two or more information subpackets comprises: identifying, for each information packet of the set of information packets, a first determined number of information subpackets, and wherein the first parity subpacket is encoded using a number of information subpackets that corresponds to the first determined number of information subpackets, and wherein each information subpacket used to encode the first parity subpacket is from a different information packet.

Aspect 4: The method of aspect 3, wherein the transmitting comprises: transmitting a second determined number of subpackets in the third transmission instance that include the first determined number of information subpackets of a third information packet and a third determined number of parity subpackets that correspond to a number of parity subpackets in the set of parity subpackets.

Aspect 5: The method of aspect 4, wherein each parity subpacket of the third determined number of parity subpackets is associated with different information subpackets.

Aspect 6: The method of any of aspects 1 through 5, wherein the encoding comprises: mapping the plurality of information subpackets into K rows and X columns of a coding table, wherein each column of the X columns corresponds to a transmission instance and each row of the K rows corresponds to one information subpacket; and generating the set of parity subpackets based at least in part on a determined relationship between respective parity subpackets of the set of parity subpackets and two or more entries of the coding table.

Aspect 7: The method of aspect 6, wherein the two or more entries of the coding table have a diagonal relationship within the coding table, and each parity subpacket of the set of parity subpackets are mapped to a parity entry of the coding table that maintains the diagonal relationship with the two or more entries.

Aspect 8: The method of aspect 7, wherein the two or more entries of the coding table include at least two entries for each row of the K rows that are associated with each parity subpacket.

Aspect 9: The method of aspect 1, wherein the identifying the two or more information subpackets comprises: segmenting each packet of the set of information packets into the two or more information subpackets.

Aspect 10: The method of aspect 9, wherein each packet of the set of information packets is an aggregated packet of two or more data packets that include a data payload, and each subpacket of the two or more information subpackets comprises one data packet.

Aspect 11: The method of any of aspects 1 through 10, further comprising: writing the plurality of information subpackets and the set of parity subpackets into a diagonal-in column-out interleaver table, and wherein the transmitting comprises transmitting each column of the diagonal-in column-out interleaver table in a respective transmission instance.

Aspect 12: The method of any of aspects 1 through 11, further comprising: transmitting, to the one or more receiving devices, control information that indicates the set of coding parameters.

Aspect 13: The method of aspect 12, wherein the set of coding parameters includes one or more of a number of information subpackets that each information packet is to be segmented into, a total number of subpackets that are transmitted in each transmission instance, or a number of parity subpackets that are transmitted in each transmission instance.

Aspect 14: The method of any of aspects 1 through 13, wherein each of the first information packet, the second information packet, and the first parity subpacket, include an indication of an information payload or a parity payload.

Aspect 15: The method of any of aspects 1 through 14, wherein each of the first information packet, the second information packet, and the first parity subpacket, include an indication of a table index of a coding table, and the table index of the coding table indicates an information payload or a parity payload.

Aspect 16: A method for wireless communication, comprising: receiving a set of signals in a plurality of transmission instances, the set of signals including a first set of signals in a first transmission instance, a second set of signals in a second transmission instance, and a third set of signals in a third transmission instance; decoding a second information packet from the second set of signals in the second transmission instance and a first parity subpacket from the third set of signals in the third transmission instance, wherein decoding of a first information packet from the first set of signals is unsuccessful; decoding at least a first information subpacket of the first information packet based at least in part on a set of coding parameters, a second information subpacket of the second information packet, and the first parity subpacket; and combining, based at least in part on decoding the second information packet and the first parity subpacket and at least the first information subpacket, the first information subpacket with one or more other information subpackets of the first information packet to generate the first information packet.

Aspect 17: The method of aspect 16, wherein each information packet of each transmission instance is segmented into a first determined number of information subpackets, and the first parity subpacket is encoded using a number of subpackets that corresponds to the first determined number of information subpackets, and each information subpacket used to encode the first parity subpacket is from a different information packet.

Aspect 18: The method of aspect 17, wherein a second determined number of subpackets in the third transmission instance include the first determined number of information subpackets of a third information packet and one or more parity subpackets.

Aspect 19: The method of any of aspects 16 through 18, wherein the decoding at least the first information subpacket comprises: determining the first information subpacket based at least in part on successfully decoded subpackets from a diagonal mapping of information subpackets and parity subpackets in a coding table.

Aspect 20: The method of any of aspects 16 through 19, wherein each of the first information packet and the second information packet is an aggregated packet of two or more data packets that include a data payload.

Aspect 21: The method of any of aspects 16 through 20, further comprising: receiving control information that indicates the set of coding parameters.

Aspect 22: The method of aspect 21, wherein the set of coding parameters includes one or more of a number of information subpackets that each information packet is segmented into, a total number of subpackets that are transmitted in each transmission instance, or a number of parity subpackets that are transmitted in each transmission instance.

Aspect 23: The method of any of aspects 16 through 22, wherein each of the first information packet, the second information packet, and the first parity subpacket, include an indication of an information payload or a parity payload.

Aspect 24: The method of any of aspects 16 through 23, wherein each of the first information packet, the second information packet, and the first parity subpacket, include an indication of a table index of a coding table, and the table index of the coding table indicates an information payload or a parity payload.

Aspect 25: An apparatus for wireless communication at a first device, comprising a processor; memory coupled with the processor; and instructions stored in the memory and executable by the processor to cause the apparatus to perform a method of any of aspects 1 through 15.

Aspect 26: An apparatus for wireless communication at a first device, comprising at least one means for performing a method of any of aspects 1 through 15.

Aspect 27: A non-transitory computer-readable medium storing code for wireless communication at a first device, the code comprising instructions executable by a processor to perform a method of any of aspects 1 through 15.

Aspect 28: An apparatus for wireless communication, comprising a processor; memory coupled with the processor; and instructions stored in the memory and executable by the processor to cause the apparatus to perform a method of any of aspects 16 through 24.

Aspect 29: An apparatus for wireless communication, comprising at least one means for performing a method of any of aspects 16 through 24.

Aspect 30: A non-transitory computer-readable medium storing code for wireless communication, the code comprising instructions executable by a processor to perform a method of any of aspects 16 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
    identifying a set of information packets for transmission to one or more receiving devices, each packet of the set of information packets for transmission in a respective transmission instance;
    identifying two or more information subpackets of each packet of the set of information packets;
    encoding a plurality of information subpackets from two or more different information packets according to a set of coding parameters to obtain a set of parity subpackets, wherein the encoding comprises:
        mapping the plurality of information subpackets into K rows and X columns of a coding table, wherein each column of the X columns corresponds to a transmission instance and each row of the K rows corresponds to one information subpacket; and
        generating the set of parity subpackets based at least in part on a determined relationship between respective parity subpackets of the set of parity subpackets and two or more entries of the coding table, wherein a first parity subpacket of the set of parity subpackets is based at least in part on a first information subpacket of a first information packet that is associated with a first transmission instance and a second information subpacket of a second information packet that is associated with a second transmission instance in accordance with the coding table, and wherein each information packet has a plurality of subpackets that each have an associated index value within the associated information packet, and the first information subpacket and the second information subpacket have different index values within the respective first information packet and second information packet; and
    transmitting, to the one or more receiving devices, the first information packet in the first transmission instance, the second information packet in the second transmission instance, and the first parity subpacket in a third transmission instance.

2. The method of claim 1, wherein a second parity subpacket of the set of parity subpackets is based at least in part on the first information subpacket and the second information subpacket, and wherein the method further comprises:
    transmitting, to the one or more receiving devices, the second parity subpacket in a fourth transmission instance.

3. The method of claim 1, wherein the identifying the two or more information subpackets comprises:
    identifying, for each information packet of the set of information packets, a first determined number of information subpackets, and wherein the first parity subpacket is encoded using a number of information subpackets that corresponds to the first determined number of information subpackets, and wherein each information subpacket used to encode the first parity subpacket is from a different information packet.

4. The method of claim 3, wherein the transmitting comprises:
    transmitting a second determined number of subpackets in the third transmission instance that include the first determined number of information subpackets of a third information packet and a third determined number of parity subpackets that correspond to a number of parity subpackets in the set of parity subpackets.

5. The method of claim 4, wherein each parity subpacket of the third determined number of parity subpackets is associated with different information subpackets.

6. The method of claim 1, wherein the two or more entries of the coding table have a diagonal relationship within the coding table, and wherein each parity subpacket of the set of parity subpackets are mapped to a parity entry of the coding table that maintains the diagonal relationship with the two or more entries.

7. The method of claim 6, wherein the two or more entries of the coding table include at least two entries for each row of the K rows that are associated with each parity subpacket.

8. The method of claim 1, wherein the identifying the two or more information subpackets comprises:
    segmenting each packet of the set of information packets into the two or more information subpackets.

9. The method of claim 8, wherein each packet of the set of information packets is an aggregated packet of two or more data packets that include a data payload, and wherein each subpacket of the two or more information subpackets comprises one data packet.

10. The method of claim 1, further comprising:
    writing the plurality of information subpackets and the set of parity subpackets into a diagonal-in column-out interleaver table, and wherein the transmitting comprises transmitting each column of the diagonal-in column-out interleaver table in a respective transmission instance.

11. The method of claim 1, further comprising:
transmitting, to the one or more receiving devices, control information that indicates the set of coding parameters.

12. The method of claim 11, wherein the set of coding parameters includes one or more of a number of information subpackets that each information packet is to be segmented into, a total number of subpackets that are transmitted in each transmission instance, or a number of parity subpackets that are transmitted in each transmission instance.

13. The method of claim 1, wherein each of the first information packet, the second information packet, and the first parity subpacket, include an indication of an information payload or a parity payload.

14. The method of claim 1, wherein each of the first information packet, the second information packet, and the first parity subpacket, include an indication of a table index of a coding table, and wherein the table index of the coding table indicates an information payload or a parity payload.

15. A first device, for wireless communication comprising:
one or more memories storing processor-executable code; and
one or more processors coupled with the one or more memories and operable to execute the code to cause the first device to:
identify a set of information packets for transmission to one or more receiving devices, each packet of the set of information packets for transmission in a respective transmission instance;
identify two or more information subpackets of each packet of the set of information packets;
encode a plurality of information subpackets from two or more different information packets according to a set of coding parameters to obtain a set of parity subpackets, wherein to encode the plurality of information subpackets the one or more processors are further operable to execute the code to cause the first device to:
map the plurality of information subpackets into K rows and X columns of a coding table, wherein each column of the X columns corresponds to a transmission instance and each row of the K rows corresponds to one information subpacket; and
generate the set of parity subpackets based at least in part on a determined relationship between respective parity subpackets of the set of parity subpackets and two or more entries of the coding table, wherein a first parity subpacket of the set of parity subpackets is based at least in part on a first information subpacket of a first information packet that is associated with a first transmission instance and a second information subpacket of a second information packet that is associated with a second transmission instance in accordance with the coding table, and wherein each information packet has a plurality of subpackets that each have an associated index value within the associated information packet, and the first information subpacket and the second information subpacket have different index values within the respective first information packet and second information packet; and
transmit, to the one or more receiving devices, the first information packet in the first transmission instance, the second information packet in the second transmission instance, and the first parity subpacket in a third transmission instance.

16. The first device of claim 15, wherein a second parity subpacket of the set of parity subpackets is based at least in part on the first information subpacket and the second information subpacket, and the one or more processors are further operable to execute the code to cause the first device to:
transmit, to the one or more receiving devices, the second parity subpacket in a fourth transmission instance.

17. The first device of claim 15, wherein, to cause the first device to identify the two or more information subpackets, the one or more processors are further operable to execute the code to cause the first device to:
identify, for each information packet of the set of information packets, a first determined number of information subpackets, and wherein the first parity subpacket is encoded using a number of information subpackets that corresponds to the first determined number of information subpackets, and wherein each information subpacket used to encode the first parity subpacket is from a different information packet.

18. A non-transitory computer-readable medium storing code for wireless communication at a first device, the code comprising instructions executable by one or more processors to:
identify a set of information packets for transmission to one or more receiving devices, each packet of the set of information packets for transmission in a respective transmission instance;
identify two or more information subpackets of each packet of the set of information packets;
encode a plurality of information subpackets from two or more different information packets according to a set of coding parameters to obtain a set of parity subpackets, wherein to encode the plurality of information packets the instructions are further executable by the one or more processors to:
map the plurality of information subpackets into K rows and X columns of a coding table, wherein each column of the X columns corresponds to a transmission instance and each row of the K rows corresponds to one information subpacket; and
generate the set of parity subpackets based at least in part on a determined relationship between respective parity subpackets of the set of parity subpackets and two or more entries of the coding table, wherein a first parity subpacket of the set of parity subpackets is based at least in part on a first information subpacket of a first information packet that is associated with a first transmission instance and a second information subpacket of a second information packet that is associated with a second transmission instance in accordance with the coding table, and wherein each information packet has a plurality of subpackets that each have an associated index value within the associated information packet, and the first information subpacket and the second information subpacket have different index values within the respective first information packet and second information packet; and
transmit, to the one or more receiving devices, the first information packet in the first transmission instance, the second information packet in the second transmission instance, and the first parity subpacket in a third transmission instance.

19. The non-transitory computer-readable medium of claim 18, wherein a second parity subpacket of the set of parity subpackets is based at least in part on the first information subpacket and the second information subpacket, and wherein the instructions are further executable by the one or more processors to:

transmit, to the one or more receiving devices, the second parity subpacket in a fourth transmission instance.

20. The non-transitory computer-readable medium of claim 18, wherein the instructions to identify the two or more information subpackets are further executable by the one or more processors to:

identify, for each information packet of the set of information packets, a first determined number of information subpackets, and wherein the first parity subpacket is encoded using a number of information subpackets that corresponds to the first determined number of information subpackets, and wherein each information subpacket used to encode the first parity subpacket is from a different information packet.

21. The non-transitory computer-readable medium of claim 20, wherein the instructions to transmit are further executable by the one or more processors to:

transmit a second determined number of subpackets in the third transmission instance that include the first determined number of information subpackets of a third information packet and a third determined number of parity subpackets that correspond to a number of parity subpackets in the set of parity subpackets.

22. The non-transitory computer-readable medium of claim 21, wherein each parity subpacket of the third determined number of parity subpackets is associated with different information subpackets.

23. The non-transitory computer-readable medium of claim 18, wherein the two or more entries of the coding table have a diagonal relationship within the coding table, and wherein each parity subpacket of the set of parity subpackets are mapped to a parity entry of the coding table that maintains the diagonal relationship with the two or more entries.

24. The non-transitory computer-readable medium of claim 23, wherein the two or more entries of the coding table include at least two entries for each row of the K rows that are associated with each parity subpacket.

25. The non-transitory computer-readable medium of claim 18, wherein the instructions to identify the two or more information subpackets are further executable by the one or more processors to:

segment each packet of the set of information packets into the two or more information subpackets.

26. A first device for wireless communication, comprising:

means for identifying a set of information packets for transmission to one or more receiving devices, each packet of the set of information packets for transmission in a respective transmission instance;

means for identifying two or more information subpackets of each packet of the set of information packets;

means for encoding a plurality of information subpackets from two or more different information packets according to a set of coding parameters to obtain a set of parity subpackets, wherein the encoding the plurality of information packets comprises:

mapping the plurality of information subpackets into K rows and X columns of a coding table, wherein each column of the X columns corresponds to a transmission instance and each row of the K rows corresponds to one information subpacket; and generating a set of parity subpackets based at least in part on a determined relationship between respective parity subpackets of the set of parity subpackets and two or more entries of the coding table, wherein a first parity subpacket of the set of parity subpackets is based at least in part on a first information subpacket of a first information packet that is associated with a first transmission instance and a second information subpacket of a second information packet that is associated with a second transmission instance in accordance with the coding table, and wherein each information packet has a plurality of subpackets that each have an associated index value within the associated information packet, and the first information subpacket and the second information subpacket have different index values within the respective first information packet and second information packet; and means for transmitting, to the one or more receiving devices, the first information packet in the first transmission instance, the second information packet in the second transmission instance, and the first parity subpacket in a third transmission instance.

27. The first device of claim 26, wherein a second parity subpacket of the set of parity subpackets is based at least in part on the first information subpacket and the second information subpacket, and wherein the first device further comprises:

means for transmitting, to the one or more receiving devices, the second parity subpacket in a fourth transmission instance.

28. The first device of claim 26, wherein the means for identifying the two or more information subpackets comprises:

means for identifying, for each information packet of the set of information packets, a first determined number of information subpackets, and wherein the first parity subpacket is encoded using a number of information subpackets that corresponds to the first determined number of information subpackets, and wherein each information subpacket used to encode the first parity subpacket is from a different information packet.

* * * * *